(12) United States Patent
Sadilek et al.

(10) Patent No.: US 12,083,912 B2
(45) Date of Patent: Sep. 10, 2024

(54) ELECTRIC SYSTEM OF ELECTRIC VEHICLE

(71) Applicant: Delta Electronics, Inc., Taipei (TW)

(72) Inventors: Tomas Sadilek, Durham, NC (US);
Ruxi Wang, Durham, NC (US);
Satyaki Mukherjee, Durham, NC (US);
Hui-Hsin Lin, Taipei (TW);
Chung-Hwa Wei, Taipei (TW); Peter Mantovanelli Barbosa, Durham, NC (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 18/282,203

(22) PCT Filed: Mar. 18, 2022

(86) PCT No.: PCT/US2022/020888
§ 371 (c)(1),
(2) Date: Sep. 18, 2023

(87) PCT Pub. No.: WO2022/198007
PCT Pub. Date: Sep. 22, 2022

(65) Prior Publication Data
US 2024/0157823 A1 May 16, 2024

Related U.S. Application Data

(60) Provisional application No. 63/162,694, filed on Mar. 18, 2021.

(51) Int. Cl.
*B60L 53/22* (2019.01)
*B60L 53/24* (2019.01)
*H02J 7/00* (2006.01)

(52) U.S. Cl.
CPC ............... *B60L 53/22* (2019.02); *B60L 53/24* (2019.02); *H02J 7/0063* (2013.01); *B60L 2210/30* (2013.01)

(58) Field of Classification Search
CPC .......... B60L 53/20; B60L 53/22; B60L 53/24; B60L 2210/30; H02J 7/0063; H02M 1/42;
(Continued)

(56) References Cited

U.S. PATENT DOCUMENTS

| | | |
|---|---|---|
| 2018/0115180 A1 | 4/2018 | Shin et al. |
| 2020/0298722 A1 | 9/2020 | Smolenaers |
| 2021/0197680 A1* | 7/2021 | Lim ................... H02M 3/1586 |

FOREIGN PATENT DOCUMENTS

| | | |
|---|---|---|
| CN | 108539833 A | 9/2018 |
| CN | 109066928 A | 12/2018 |

(Continued)

*Primary Examiner* — Carlos Amaya
(74) *Attorney, Agent, or Firm* — KIRTON McCONKIE; Evan R. Witt

(57) ABSTRACT

The present disclosure provides a motor drive integrated on-board charger to reduce the quantity of components in an electric system of an electric vehicle. Reduction of components is achieved by utilizing the motor and the motor driving inverter as a part of the on-board charger in the charging mode. By controlling relays, electrical connections of the system may be reconfigured according to its mode of operation. In one aspect, the motor and the motor driving inverter play the roles of a boost PFC, a current regulator, or both.

22 Claims, 17 Drawing Sheets

(58) Field of Classification Search
CPC ............. H02M 1/4208; H02M 1/4216; H02M 1/4233; H02M 1/4241; H02M 1/425; H02M 1/4258; H02M 1/4266; H02M 1/4283; H02M 1/4291
See application file for complete search history.

(56) References Cited

FOREIGN PATENT DOCUMENTS

| | | | |
|---|---|---|---|
| CN | 109510453 | A | 3/2019 |
| CN | 111347925 | A | 6/2020 |
| TW | 202046622 | A | 12/2020 |

\* cited by examiner

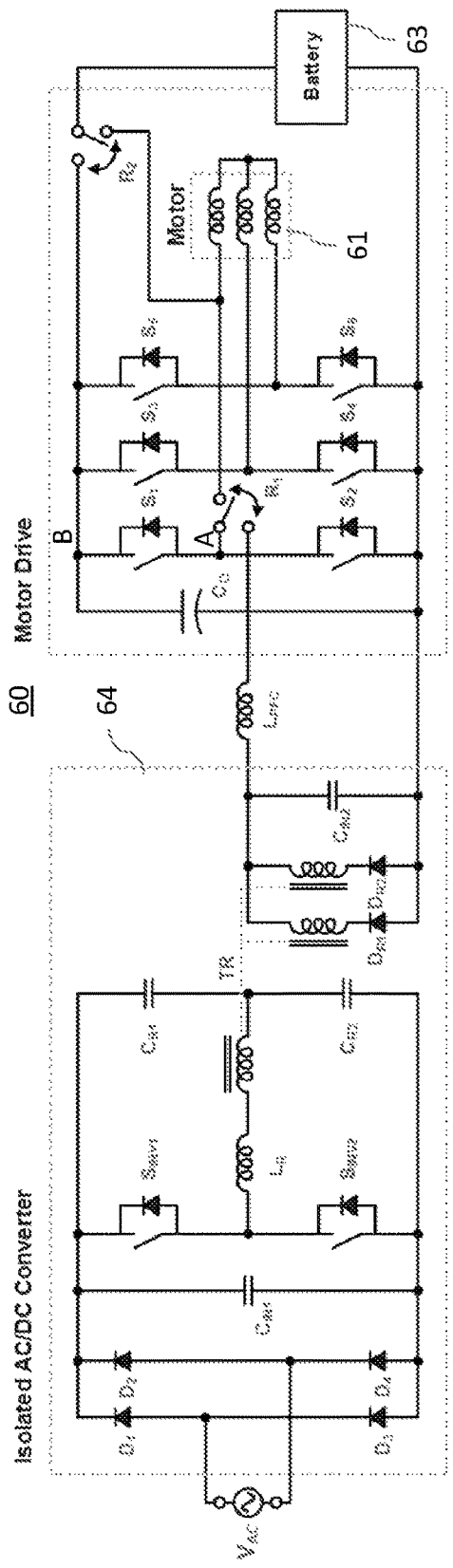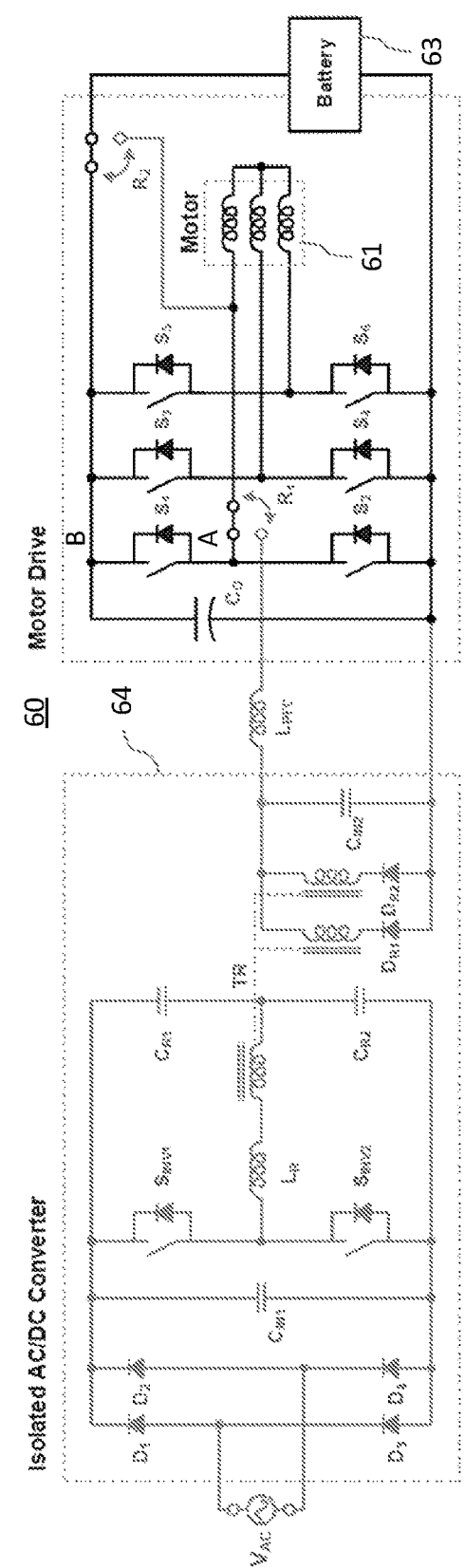
FIG. 6A
FIG. 6B

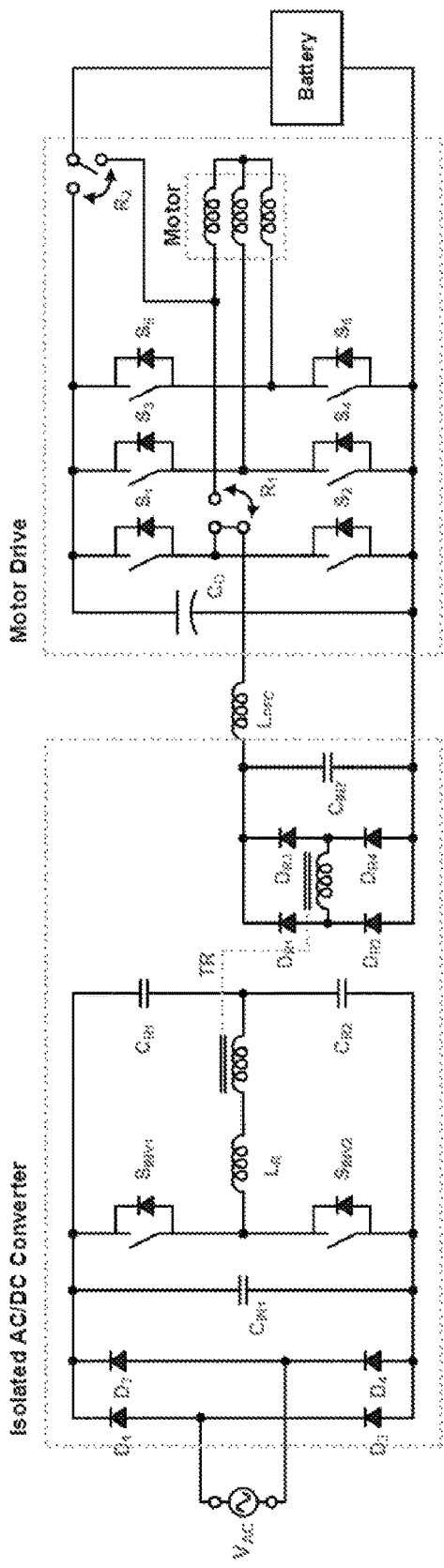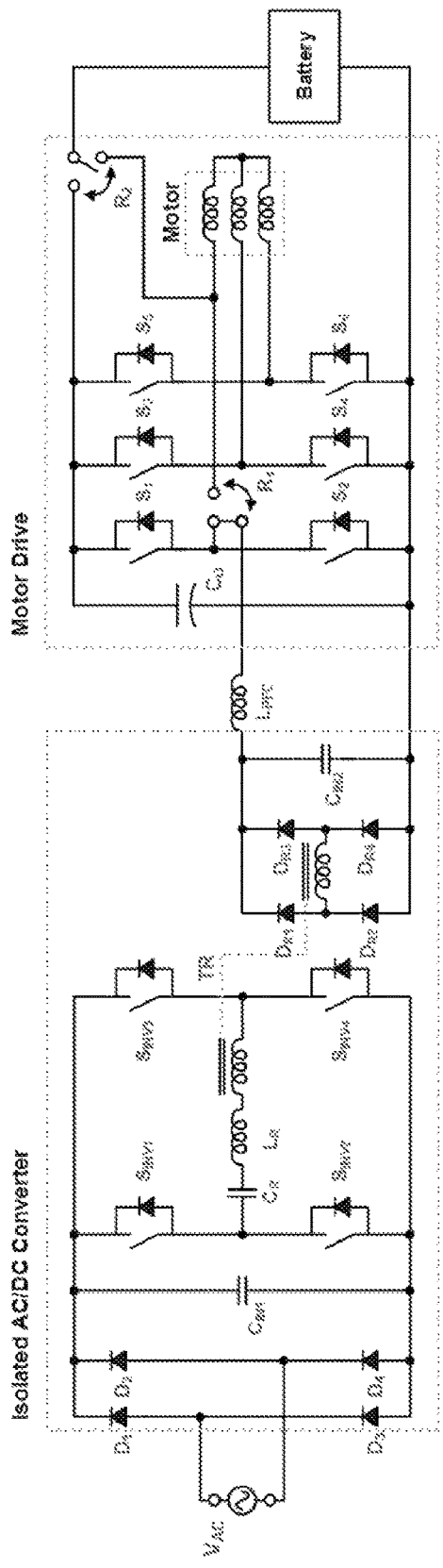
FIG. 8A
FIG. 8B

ELECTRIC SYSTEM OF ELECTRIC VEHICLE

RELATED APPLICATION

This application claims the benefit of priority to U.S. Provisional Application No. 63/162,694, filed Mar. 18, 2021, the entire contents of which are incorporated herein by reference for all purposes.

TECHNICAL FIELD

The present disclosure relates to the implementation of an on-board charger utilizing components of a motor driving circuit to reduce the cost and volume of the electric system in electric vehicles.

BACKGROUND

Electric vehicles are driven by electric motors as opposed to internal combustion engines. Electric motors do not emit greenhouse gas, whereas internal combustion engines do, causing air pollution and global warming. As protection of the environment becomes progressively important, interests in electric vehicles have been sharply increasing.

FIG. 1A illustrates a conceptual schematic of an electric system 10 of an electric vehicle. System 10 includes a motor 11, a motor drive 12, a battery 13, an on-board battery-charger 14, and an AC input 15. Electric motor 11 can be connected to a mechanical system of the electric vehicle. Electric motor 11 converts electric energy in system 10 to mechanical energy so as to rotate wheels of the electric vehicle. Motor drive 12 delivers electric energy from battery 13 to motor 11. On-board charger 14 delivers electric energy from external AC input 15 to battery 13. Therefore, it can be noted that electric system 10 contains components for both motor drive 12 and on-board charger 14.

FIGS. 1B and 1C illustrate electric energy flow directions in system 10 in the driving mode and the battery charging mode, respectively. In the driving mode, as shown in FIG. 1B, electric energy is delivered from battery 13 to motor 11. Battery 13 is being discharged, and the on-board charger 14 does not operate. In the battery charging mode, as shown in FIG. 1C, electric energy is delivered from AC input 15 to battery 13. Battery 13 is being charged, and motor drive 12 does not operate. At this point, it can be noted that in electric system 10, motor drive 12 and on-board charger 14 do not operate at the same time. That is, only motor drive 12 is active in the driving mode, while only on-board charger 14 is active in the battery charging mode. Because motor drive 12 and on-board charger 14 do not operate at the same time, there is a need to utilize motor 11 and/or motor drive 12 as a part of on-board charger 14 so as to reduce the number of components for system 10.

FIG. 2A illustrates an exemplary schematic circuit of a conventional electric system 20 of an electric vehicle with a three-phase motor. Electric system 20 includes a three-phase motor 21, a motor drive inverter 22, a battery 23, an on-board charger 24, and an AC input 25. Three-phase motor 21 and motor driving inverter 22 are connected to the right side of battery 23 through relay $R_2$. Due to safety concerns, relays $R_1$ and $R_2$ are essential, such that battery 23 can be physically disconnected from system 20 when system 20 does not operate.

Three-phase motor 21 has three windings embedded in the stator assembly. Each stator winding can be electrically represented as an inductor. Motor drive inverter 22 includes three identical half-bridge legs with switches $S_1, S_2, \ldots, S_6$. The switching node of each half-bridge leg is connected to one end of the stator windings of motor 21. The other ends of the stator windings are connected together to a single node, which is called the neutral point. Motor drive inverter 22 controls the motor phase currents and therefore torque by adjusting the duty ratios of the half-bridge legs. On-board charger 24 has two stages, an AC/DC power factor correcting (PFC) stage 241 and an isolated DC/DC converter stage 242. AC/DC PFC stage 241 regulates the shape of the input current such that the charger achieves high power factor and low total harmonic distortion of input current.

In AC/DC PFC stage 241, a boost converter is generally used because of its continuous input current and easy control. In this example, AC/DC PFC stage 241 includes rectifier diodes $D_1$, $D_2$, $D_3$, and $D_4$, boost inductor $L_{PFC}$, boost switch $S_{B1}$, and boost diode $D_5$. The output voltage of AC/DC PFC stage 241 across link capacitor $C_{O,PFC}$ becomes quasi-DC with a low frequency ripple. The ripple is caused by the large power ripple typical to single-phase systems. When input voltage $V_{AC}$ is zero, input power is zero, whereas when input voltage $V_{AC}$ is maximal, power is also maximal. Thus, the AC/DC PFC stage power flow fluctuates over the line cycle. Because there are two zero crossings in the AC voltage, PFC power fluctuates at twice the grid frequency.

The DC/DC converter stage 242 follows AC/DC PFC stage 241 and provides an isolation barrier as well as a constant DC charging current for battery 23. For an isolated DC/DC converter, the LLC resonant converter topology is widely used nowadays because it yields high efficiency with a small number of components. FIG. 2A shows an isolated half-bridge LLC resonant converter, which includes main switches $S_{INV1}$ and $S_{INV2}$, resonant inductor $L_R$, resonant capacitors $C_{R1}$ and $C_{R2}$, transformer $T_R$, rectifier diodes $D_{R1}$ and $D_{R2}$, and a capacitor $C_{IN2}$. It can be noted that three main functionalities of an on-board charger are power factor correction, isolation, and DC charging current regulation.

FIGS. 2B and 2C respectively illustrate the driving mode and the battery charging mode of the conventional electric system in FIG. 2A. FIG. 2B illustrates the driving mode operation, where relay $R_2$ is closed and relay $R_1$ is opened so that battery 23 is connected only to motor 21 and motor driving inverter 22. On-board charger 24 is turned off and thus inactive. The energy stored in battery 23 is gradually depleted by driving the vehicle using system 20. FIG. 2C illustrates the charging mode operation, where relay $R_2$ is opened and relay $R_1$ is closed such that battery 23 is connected only to on-board charger 24. Motor driving inverter 22 is turned off and motor 21 does not operate.

REFERENCES

[1] S. R. Meher, S. Banerjee, B. T. Vankayalapati, and R. K. Singh, "A Reconfigurable On-Board Power Converter for Electric Vehicle With Reduced Switch Count," *IEEE Trans. on Vehicular Technology*, vol. 69, no. 4, April 2020.

[2] M. Tong, M. Chenc, W. Hua, and S. Ding, "A Single-Phase On-Board Two-Stage Integrated Battery Charger for EVs Based on a Five-Phase Hybrid-Excitation Flux-Switching Machine," *IEEE Trans. on Vehicular Technology*, vol. 69, no. 4, April 2020.

[3] Khan, Mehnaz Akhter, Iqbal Husain, and Yilmaz Sozer. "Integrated electric motor drive and power electronics for bidirectional power flow between the electric vehicle and DC or AC grid." *IEEE Transactions on Power Electronics* 28.12 (2013): 5774-5783.

[4] Subotic, Ivan, and Emil Levi. "A review of single-phase on-board integrated battery charging topologies for electric vehicles." *2015 IEEE Workshop on Electrical Machines Design, Control and Diagnosis (WEMDCD)*. IEEE, 2015.

SUMMARY

The present disclosure provides motor drive integrated on-board chargers capable of reducing the number of components of electric system of an electric vehicle. In an electric vehicle, an electric system includes a motor, a motor driver, and an on-board charger. In the charging mode, the on-board charger performs three main functions: power factor correction, isolation, and current regulation. In conventional systems, each part in the electric system performs its single functionality. Therefore, motor and motor driving inverter are not used in the charging mode. On the other hand, the on-board charger is not used in driving mode. The converter topologies of the present disclosure utilize motor and motor driving inverter as a part of the on-board charger in the charging mode to reduce the number of components in the electric system. According to embodiments of the present disclosure, the motor and the motor driving inverter may provide the functions of power factor correction and current regulation in the charging mode by reconfiguring topology with relays. Therefore, the disclosed motor drive integrated on-board chargers may reduce components in the on-board charger, thereby improving the cost effectiveness of the electric system.

In one aspect, one embodiment of the present disclosure provides an electric system of an electric vehicle including an AC/DC converter, a motor drive including a motor and an inverter, a power factor correcting (PFC) inductor electrically connected between the AC/DC converter and the motor drive, a link capacitor connected in parallel with the motor drive, a first relay connected between the PFC inductor and the motor drive, and a second relay through which a battery is connected to the link capacitor.

In one embodiment, the motor incudes a plurality of phases, and the inverter includes a plurality of phase legs, each first end of the phases being connected to a respective one of the phase legs.

In one embodiment, the second ends of the phases are connected at a neutral point. In one embodiment, the PFC inductor is connected to a selected one of the phase legs through the first relay.

In one embodiment, the phase leg includes two switches, and the PFC inductor is connected to a terminal between the two switches of a selected one of the phase legs through the first relay.

In one embodiment, in the driving mode, the first relay is opened and the second relay is closed, and the battery is capable of being discharged to power the motor.

In one embodiment, in the charging mode, the first relay and the second relay are closed, and the battery is capable of being charged using an AC power source.

In one embodiment, the AC/DC converter includes an LLC series resonant converter capable of receiving an AC power source at an input terminal and generating a DC power at an output terminal.

In one embodiment, the AC/DC converter includes one of an isolated AC/DC rectifier having a half bridge inverter and a full bridge rectifier, an isolated AC/DC rectifier having a full bridge inverter and a full bridge rectifier, an isolated AC/DC rectifier having a half bridge inverter and a voltage doubler rectifier, and an isolated AC/DC rectifier having a full bridge inverter and a voltage doubler rectifier.

In accordance with an aspect of one embodiment of the present disclosure, there is provided an electric system of an electric vehicle. The electric system includes an AC/DC converter, a motor drive including a motor and an inverter, a power factor correcting (PFC) inductor electrically connected between the AC/DC converter and the motor drive, a link capacitor connected in parallel with the motor drive, a first relay, and a second relay. The motor includes a plurality of phases, and the inverter includes a plurality of phase legs, each of the phases being connected to a respective one of the phase legs. The first relay is configured to selectively connect a selected one of the phase legs either to a respective one of the phases of the motor or to the PFC inductor, and the second relay is configured to selectively connect a battery either to a positive terminal of the inverter or to the respective one of the phases of the motor.

In one embodiment, each phase leg of the inverter includes two switches, and the first relay is connected between the PFC inductor and a terminal between the two switches of the selected one of the phase legs.

In one embodiment, one ends of the phase legs are connected together at a neutral point.

In one embodiment, the first and second relays include single-pole double-throw relays.

In one embodiment, in the driving mode, the first relay connects the selected one of the phase legs to the respective one of the phases of the motor, the second relay connects the battery to the positive terminal of the inverter, and the battery is capable of being discharged to power the motor.

In one embodiment, in the charging mode, the first relay connects the selected one of the phase legs to the PFC inductor, the second relay connects the battery to the respective one of the phases of the motor, and the battery is capable of being charged using an AC power source.

In one embodiment, the AC/DC converter includes an LLC series resonant converter, capable of receiving an AC power source at an input terminal and generating a DC power at an output terminal.

In one embodiment, the AC/DC converter includes one of an isolated AC/DC rectifier having a half bridge inverter and a full bridge rectifier, an isolated AC/DC rectifier having a full bridge inverter and a full bridge rectifier, an isolated AC/DC rectifier having a half bridge inverter and a voltage doubler rectifier, and an isolated AC/DC rectifier having a foll bridge inverter and a voltage doubler rectifier.

According to one aspect of one embodiment of the present disclosure, there is provided an electric system of an electric vehicle including an AC/DC converter, a motor drive including a motor and an inverter, a power factor correcting (PFC) inductor electrically connected between the AC/DC converter and the motor drive, a link capacitor connected in parallel with the motor drive, a first relay, a second relay, and a third relay, wherein the motor includes a plurality of phases, the inverter includes a plurality of phase legs, each of the phases being connected to a respective one of the phase legs, the first relay is connected between a selected one of the phase legs and a respective one of the phases, the second relay is configured to connect or disconnect the selected one of the phase legs with the PFC inductor and configured to connect or disconnect said respective one of the phases with a buffer capacitor, and a battery of the electric vehicle is connected to the link capacitor through the third relay.

In one embodiment, the second relay includes a double-pole double-throw relay.

In one embodiment, in the driving mode, the first and third relays are closed and the second relay is opened, and the battery is capable of being discharged to power the motor.

In one embodiment, in the charging mode, the second and third relays are closed and the first relay is opened, and the battery is capable of being charged using an AC power source.

In accordance with an aspect of another embodiment of the present disclosure, there is provided an electric system of an electric vehicle including an AC/DC converter capable of receiving an AC power source at an input terminal of the AC/DC converter and providing a DC power at an output terminal of the AC/DC converter, a first relay electrically connected to the output terminal of the AC/DC converter, a motor connected to the AC/DC converter through the first relay, a motor driving inverter connected to the motor, a link capacitor connected in parallel with the motor driving inverter, and a second relay through which the link capacitor is connected to a battery.

In one embodiment, in the driving mode, the first relay is opened and the second relay is closed, and the battery is capable of being discharged to power the motor.

In one embodiment, in the charging mode, the first relay and the second relay are closed, and the battery is capable of being charged using the AC power source.

In one embodiment, the motor includes a plurality of phase legs with one end of the phase legs being connected at a neutral point, and wherein the first relay is connected to the neutral point.

In one embodiment, the electric system further includes a third relay electrically connected to the first relay, the motor, and the motor driving inverter.

In one embodiment, the motor includes a plurality of phases, the motor driving inverter includes a plurality of phase legs, and one of the phases of the motor is connected to a respective one of the phase legs of the motor driving inverter through the third relay. In the driving mode, the first relay is opened and the second relay and the third relay are closed, and the battery is capable of being discharged to power the motor. In the charging mode, the first relay and the second relay are closed and the third relay is opened, and the battery is capable of being charged using the AC power source.

The present invention is better understood upon consideration of the following detailed description and accompanying figures.

BRIEF DESCRIPTION OF THE DRAWINGS

FIG. 6A illustrates an electric system of an electric vehicle having a motor drive integrated on-board charger in accordance with a third embodiment of the present disclosure.

FIGS. 6B and 6C respectively illustrate the driving mode and the battery charging mode of the motor drive integrated on-board charger as shown in FIG. GA.

FIGS. 8A, 8B, 8C, and 8D illustrate an electric system of an electric vehicle having a motor drive integrated on-board charger with topological variations of the isolated AC/DC rectifier.

DETAILED DESCRIPTION

Figure 3A:
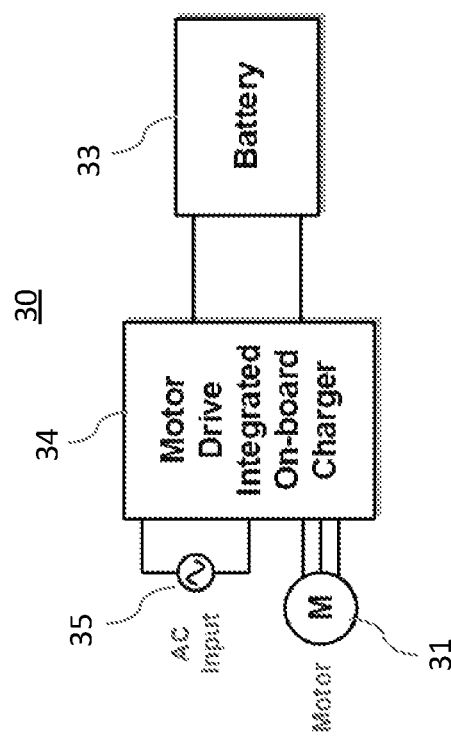
FIG. 3A illustrates a schematic diagram of an electric system of an electric vehicle with a motor drive integrated on-board charger according to the present disclosure.

FIG. 3A illustrates a schematic diagram of an electric system 30 of an electric vehicle with a motor drive integrated on-board charger 34 according to one embodiment of the present disclosure. In order to reduce the number of components, motor drive integrated on-board charger 34 provides functionalities of both the motor drive and the on-board charger. This integrated structure is possible because the motor drive and the on-board charger do not operate at the same time. In the driving mode, electric system 30 operates as a motor drive; while in the battery charging mode, electric system 30 operates as an on-board charger.

Figure 3C:
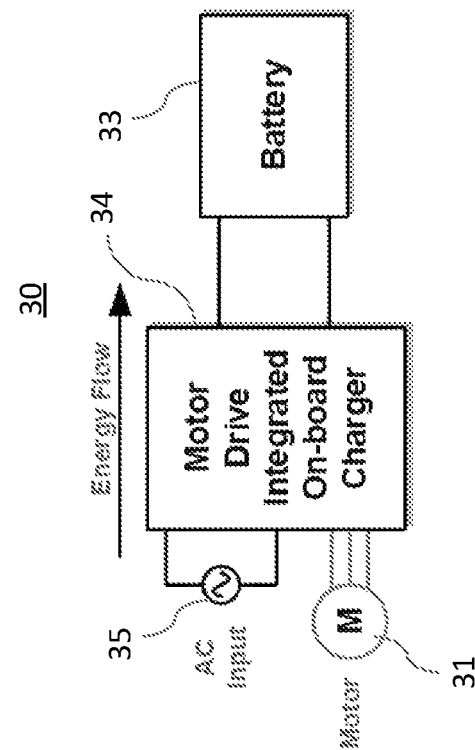
FIGS. 3B and 3C illustrate electric energy flow directions of the system of FIG. 3A in the driving mode and the battery charging mode, respectively.
Figure 3B:
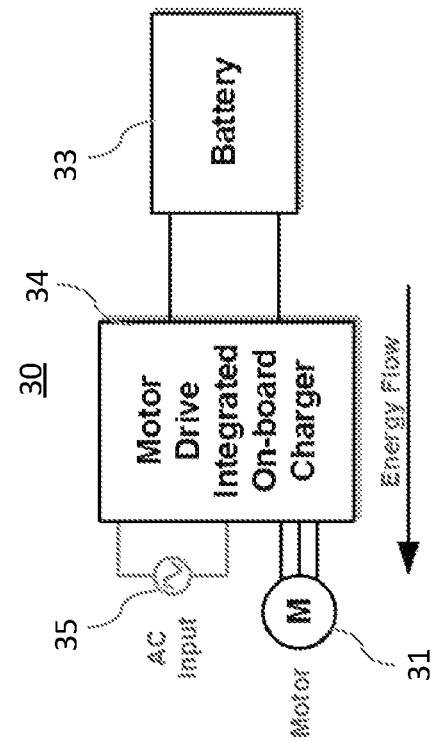

FIGS. 3B and 3C illustrate electric energy flow directions of system 30 in the driving mode and the battery charging mode, respectively. In the driving mode, as shown in FIG. 3B, electric energy is delivered from battery 33 to motor 31. Battery 33 is being discharged, and AC input 35 is disconnected. In the battery charging mode, as shown in FIG. 3C, electric energy is delivered from external AC input 35 to battery 33. Battery 33 is being charged. This functionality is the primary difference between the conventional approach and the motor drive integrated on-board charger approach. For the motor drive integrated on-board charger approach, motor 31 and components in motor drive integrated on-board charger 34 operate as a part of the on-board charger, such that the number of components for the on-board charger can be reduced.

Figure 4A:
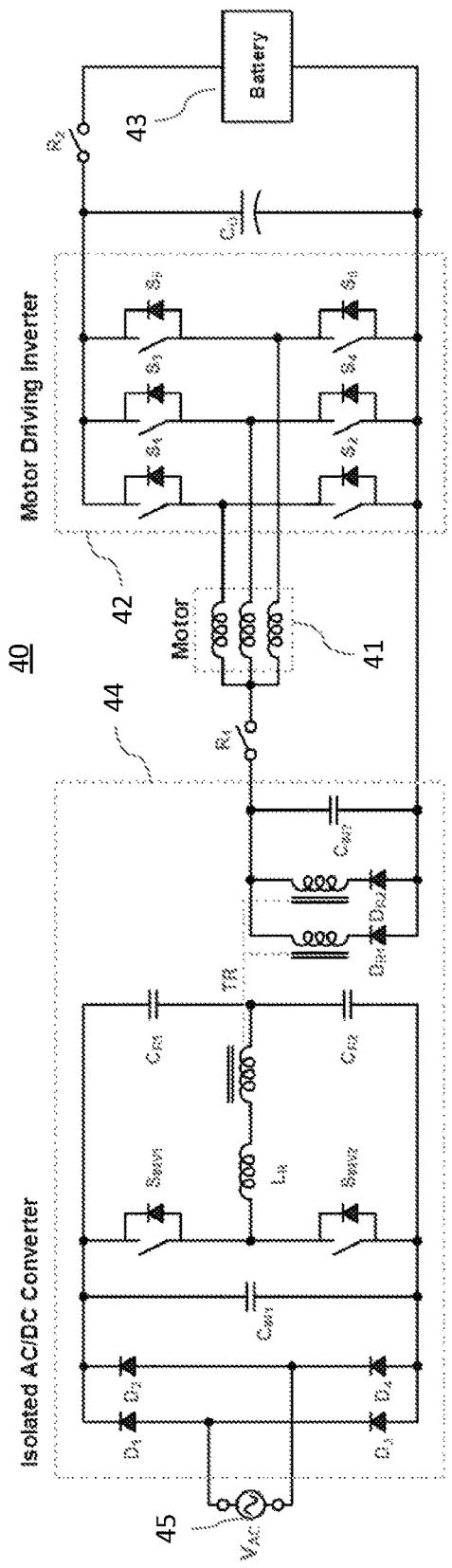
FIG. 4A illustrates an electric system of an electric vehicle having a motor drive integrated on-board charger in accordance with a first embodiment of the present disclosure.

FIG. 4A illustrates an electric system 40 of an electric vehicle having a motor drive integrated on-board charger in accordance with a first embodiment of the present disclosure. As shown, electric system 40 includes a motor 41, a motor driving inverter 42, a battery 43, an isolated AC/DC converter 44, and an external AC power input 45. In one embodiment, motor 41 includes three motor windings (three phase motor) with all of the motor windings being connected together at a neutral point.

Figure 1A:
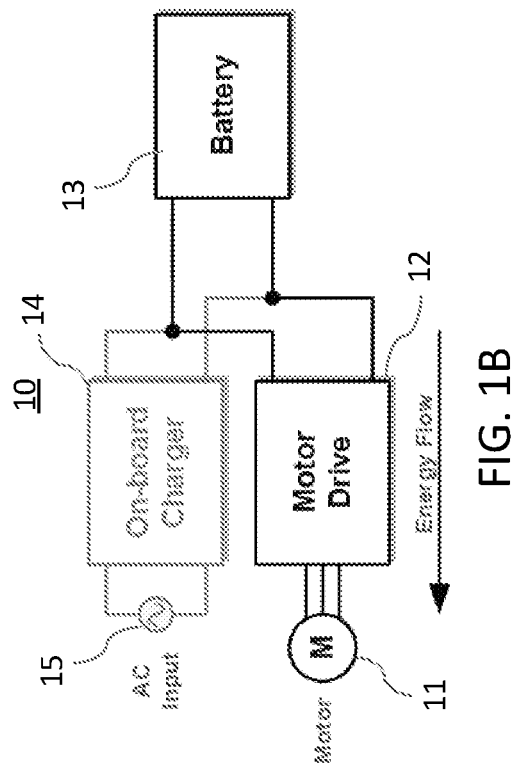
FIG. 1A illustrates a schematic diagram of a conventional electric system of an electric vehicle.
Figure 1B:
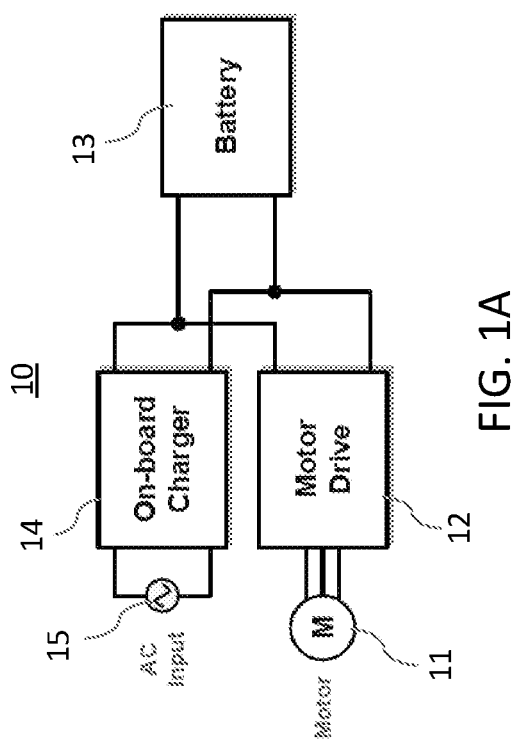
FIGS. 1B and 1C illustrate electric energy flow directions in the system of FIG. 1A in the driving mode and the battery charging mode, respectively.
Figure 1C:
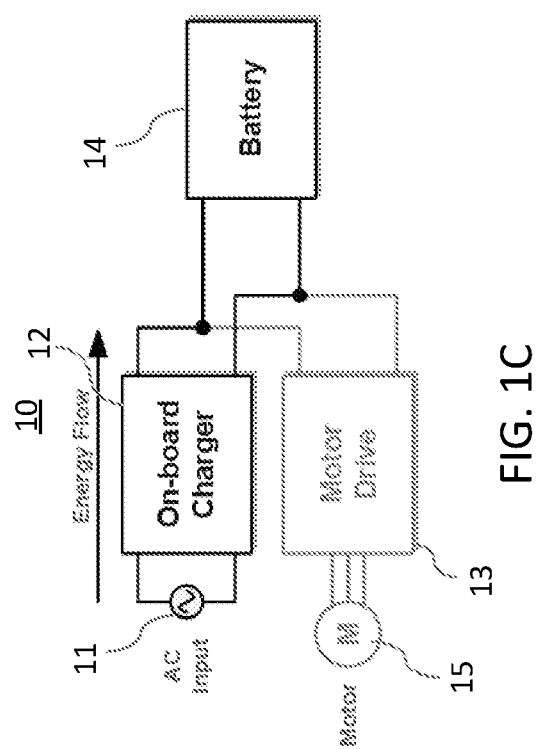
Figure 2A:
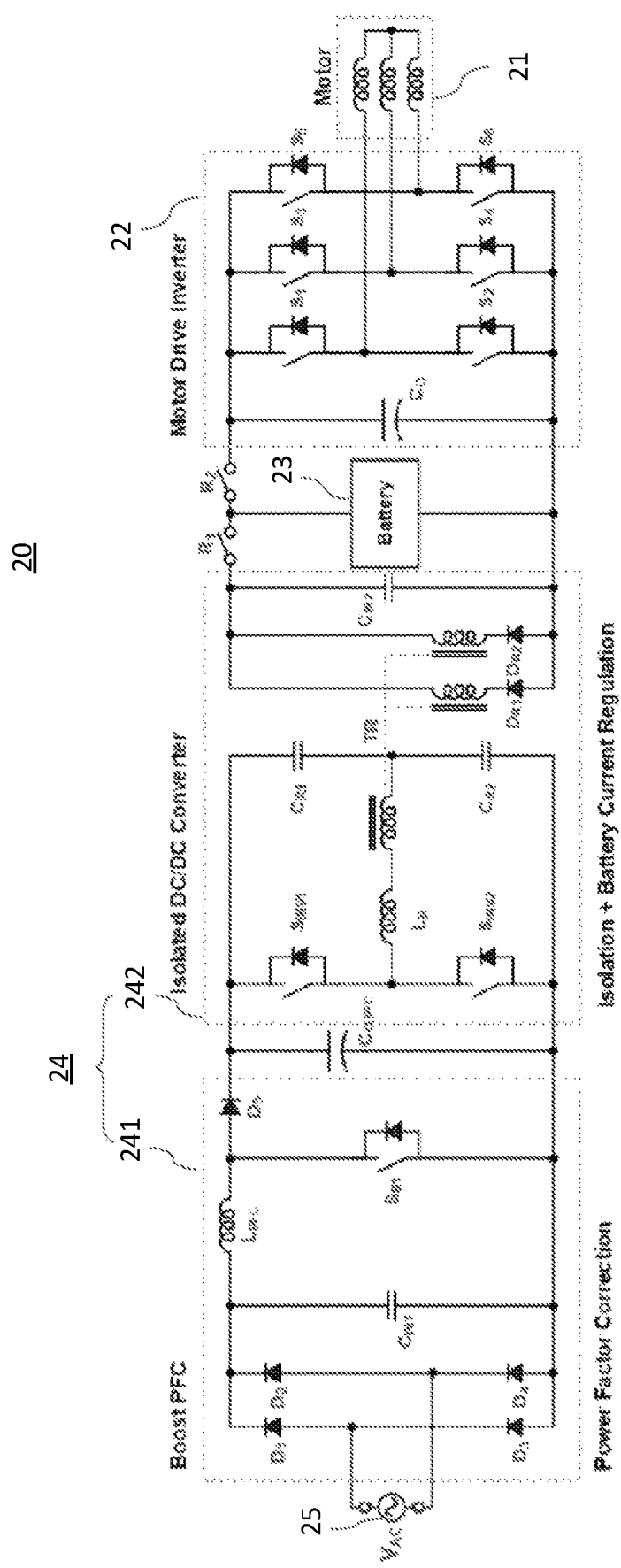
FIG. 2A illustrates an exemplary schematic circuit of a conventional electric system of an electric vehicle with a three-phase motor.

Isolated AC/DC converter 44 includes rectifier diodes $D_1$, $D_2$, $D_3$, and $D_4$, input capacitor $C_{IN1}$, and an LLC converter. The LLC converter includes two switches $S_{INV1}$ and $S_{INV2}$, a resonant inductor $L_R$, resonant capacitors $C_{R1}$ and $C_{R2}$, a transformer $T_R$, rectifier diodes $D_{R1}$ and $D_{R2}$, and a capacitor $C_{IN2}$. Capacitor $C_{IN2}$ is connected to the neutral point of motor 41 through a relay $R_1$. Motor driving inverter 42 may include switches $S_1$, $S_2$, $S_3$, $S_4$, $S_5$, and $S_6$. Each end of the motor windings of motor 41 opposing the neutral point is connected to two of switches $S_1$, $S_2$, $S_3$, $S_4$, $S_5$, and $S_6$ of motor driving inverter 42. Motor driving inverter 42 is connected in parallel with a link capacitor $C_O$, while battery 43 is connected across link capacitor $C_O$, through a relay $R_2$. Compared to the conventional system in FIG. 2A, converter 44 of the embodiment in FIG. 4A may not include boost inductor $L_{PFC}$, switch $S_{B1}$, diode $D_5$, and capacitor $C_{O,PFC}$, thereby reducing the cost of the system.

Figure 2B:
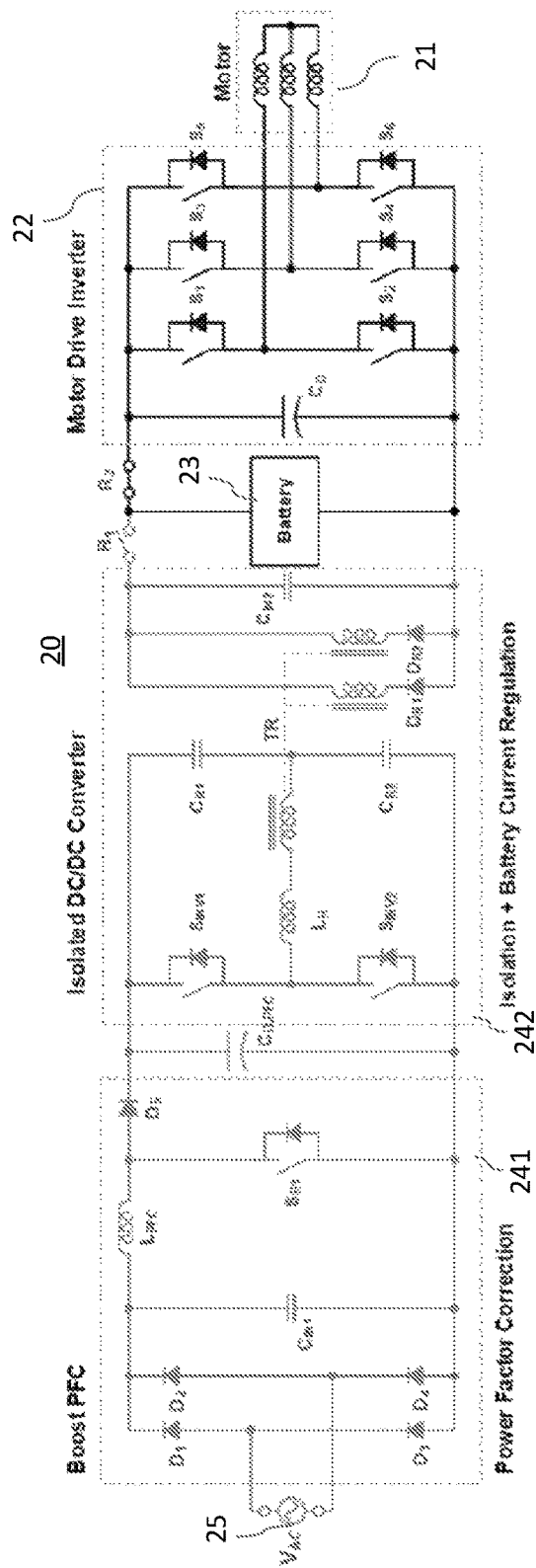
FIGS. 2B and 2C respectively illustrate the driving mode and the battery charging mode of the conventional electric system in FIG. 2A.
Figure 2C:
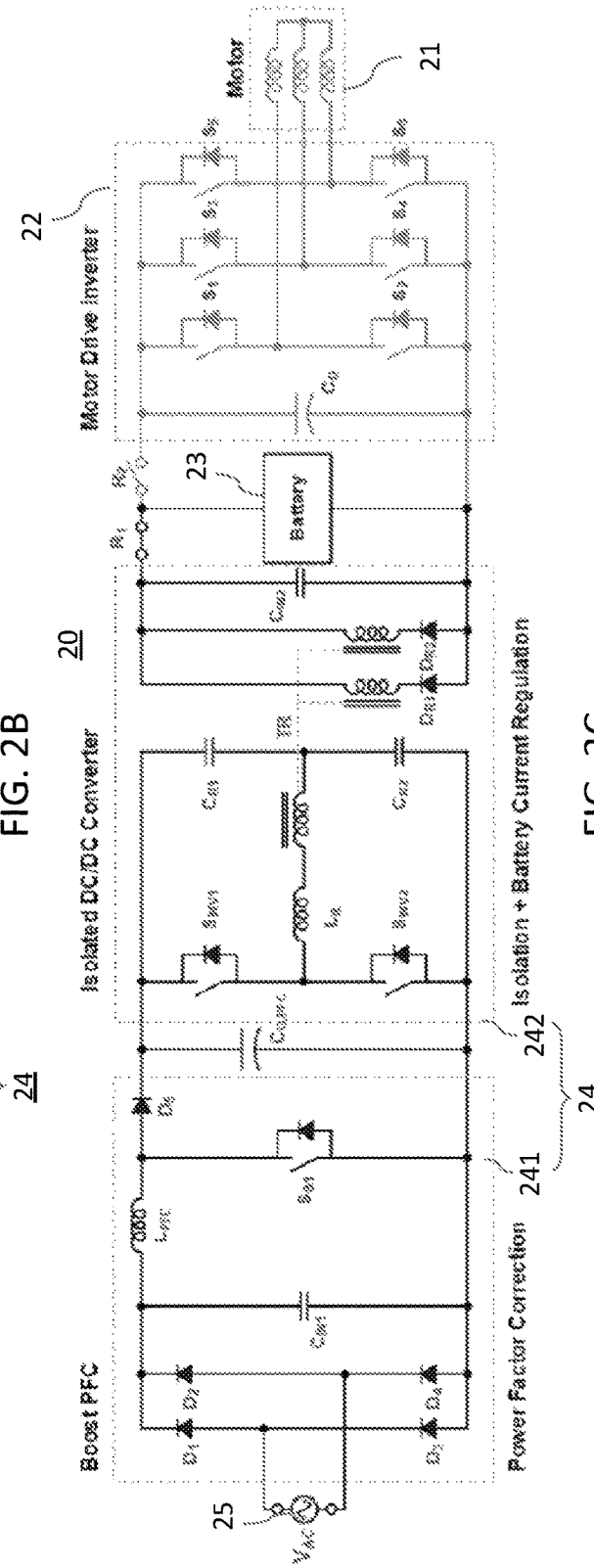
Figure 4B:
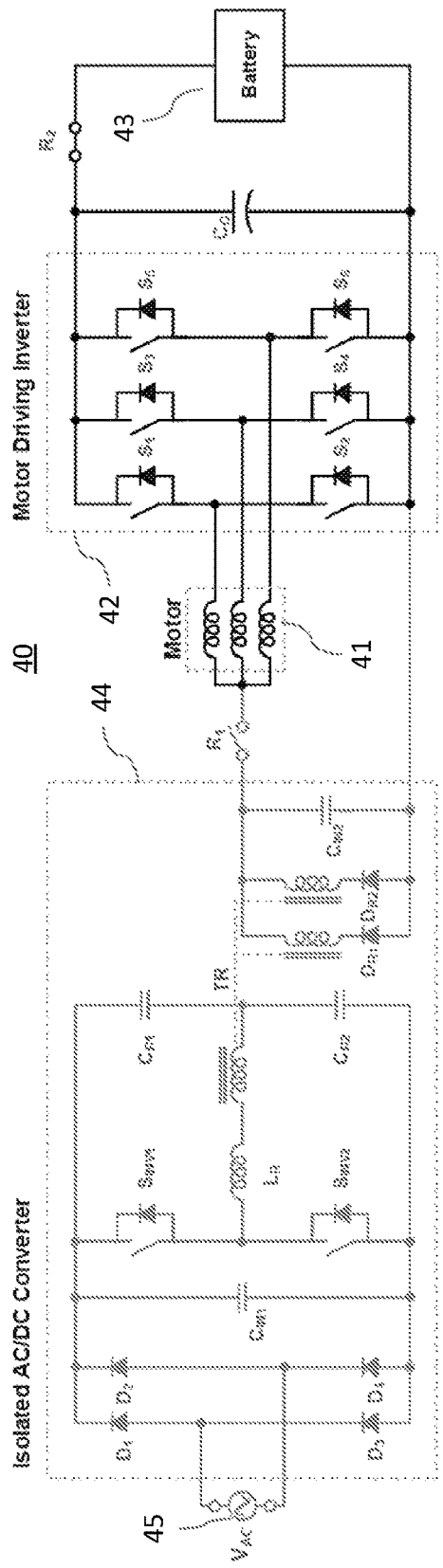
FIGS. 4B and 4C respectively illustrate the driving mode and the battery charging mode of the motor drive integrated on-board charger as shown in FIG. 4A.
Figure 4C:
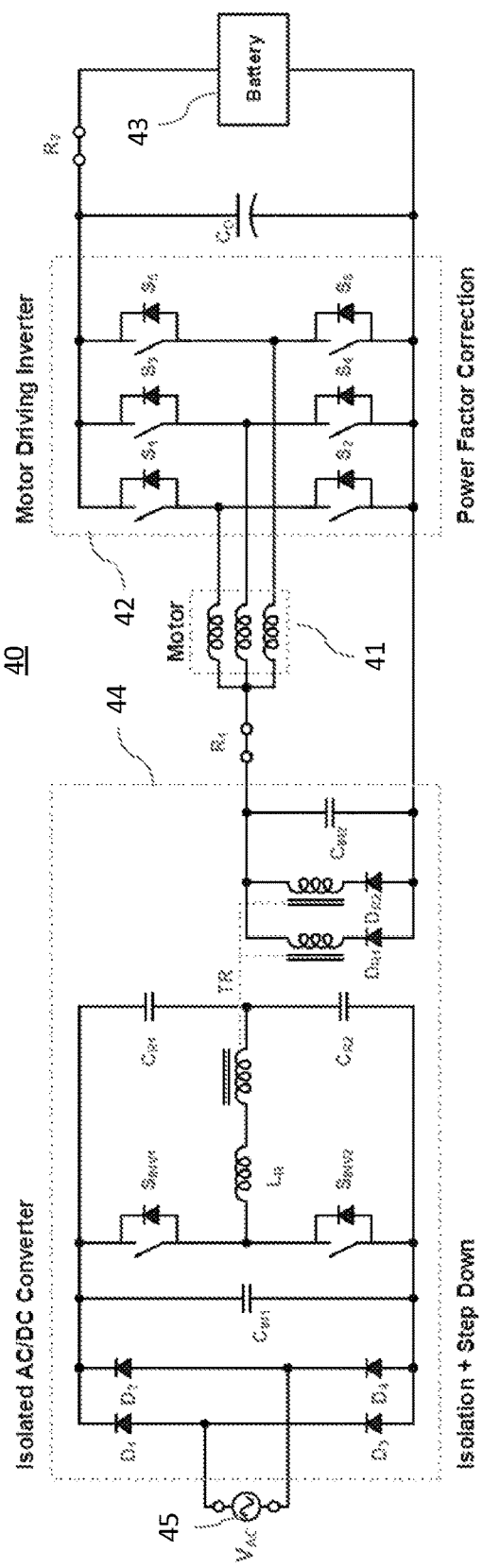

FIGS. 4B and 4C respectively illustrate the driving mode and the battery charging mode of the motor drive integrated on-board charger as shown in FIG. 4A. In one embodiment, in the driving mode, as shown in FIG. 4B, relay $R_1$ is opened and relay $R_2$ is closed, such that battery 43 may be connected only to motor 41 and motor driving inverter 42 and that isolated AC/DC converter 44 is turned off. It can be noted that the electrical connection of electric system 40 in FIG. 4B, is substantially identical as the electrical connection of that shown in FIG. 2B. In the charging mode, as shown in FIG. 4C, both relays $R_1$ and $R_2$ are closed, such that electric energy can flow from AC power input 45 to battery 43. It can be noted that both motor 41 and motor driving inverter 42 become a part of the charging system. In contrast, motor 41 and motor driving inverter 42 are not used during the charging mode in electric system 20 of FIG. 2B.

In this embodiment, in the charging mode, the LLC converter in isolated AC/DC converter 44 is used as an AC/DC rectifier and provides isolation and scaling of AC power input 45. The switching frequency of the LLC converter can vary from one half to five times the resonant frequency determined by the resonant tank components $L_R$, $C_{R1}$, and $C_{R2}$. It can be noted that the switching frequency is much higher than the AC input line frequency (e.g., 60 Hz). Therefore, the voltage across capacitor $C_{IN2}$ becomes a scaled absolute value of AC input line voltage $V_{AC}$. Motor driving inverter 42 and the three windings of motor 41 can be considered as three independent boost converters connected in parallel such that they operate as a composite boost power factor correction circuit. By doing so, the circuit in FIG. 4C can provide isolation and power factor correction with a reduced number of components. In the embodiment, the electric system 40 of FIG. 4C, however, might have a large ripple in the charging current due to the output voltage ripple of the PFC circuit. Therefore, in some embodiments, the electric system 40 of FIG. 4C might be applicable to systems where such a battery current ripple is acceptable.

One advantage of the motor drive integrated on-board charger as shown in FIG. 4C is that it offers simple control. Because input capacitor $C_{IN1}$ is relatively small, the voltage across it is the rectified version of input voltage $V_{AC}$. Input capacitor $C_{IN1}$ sets the voltage across the LLC resonant converter. The resonant converter operates at 50% duty cycle, constant switching frequency, and scales down the voltage across input capacitor $C_{IN1}$ to a lower value due to the lower number of turns on the secondary winding of transformer $T_R$ as compared to the number of turns on the primary winding. The LLC converter switching frequency is based on battery voltage, battery current, and input voltage $V_{AC}$ to provide an appropriate level of AC voltage to input-capacitor $C_{IN2}$. Similar to input capacitor $C_{IN1}$, capacitor $C_{IN2}$ also has a small value. As a result, voltage across capacitor $C_{IN2}$ is likewise a scaled-down rectifier input voltage $V_{AC}$. Because there is no significant energy storage in AC/DC converter 44, both capacitor voltages follow the shape of input voltage $V_{AC}$. Such a system can be described to have soft DC links as opposed to systems that use a larger capacitance value to hold the DC link at a quasi-constant value, such as, electric system 20 of FIG. 2A.

The three phase motor driving inverter phase legs are controlled such that the currents drawn by each motor winding are equal to each other. The motor winding current reference follows the shape of the voltage across input-capacitor $C_{IN2}$. As stated above, voltage across capacitor $C_{IN2}$ is a rectified sine wave. Thus, if the voltage across capacitor $C_{IN2}$ is zero, no current is drawn from it. As a result, the voltage and current waveforms on the output side of AC/DC converter 44 are both rectified sinusoids of the same frequency and alignment. As there is no significant energy storage in AC/DC converter 44, input power is equal to output power. It follows that the input current of AC/DC converter 44 is also a rectified sinewave. Thus, the input current drawn from the grid is of the same shape and angle as input voltage $V_{AC}$. The presented converter therefore yields the power factor correction property. The magnitude of the phase winding current reference is dependent on the battery charging algorithm. When the battery is depleted, the current reference magnitude will be at its maximum value supported by the converter power processing capability. As the battery state-of-charge approaches maximum, the magnitude of the current reference will gradually decrease to zero.

Further, even though all windings carry time-varying current, the configuration of the embodiment shown in FIG. 4C produces no pulsating torque, because all winding currents are equal to each other. This is possible due to the external motor neutral connection. When all three winding currents are equal to each other, the motor carries only zero-sequence currents that produce no steady-state or low-frequency torque that would cause the motor to vibrate. The only torque component produced in the system is small switching-frequency ripple torque due to winding ripple current. The ripple current is inversely proportional to both motor inductance and switching frequency.

Figure 5A:
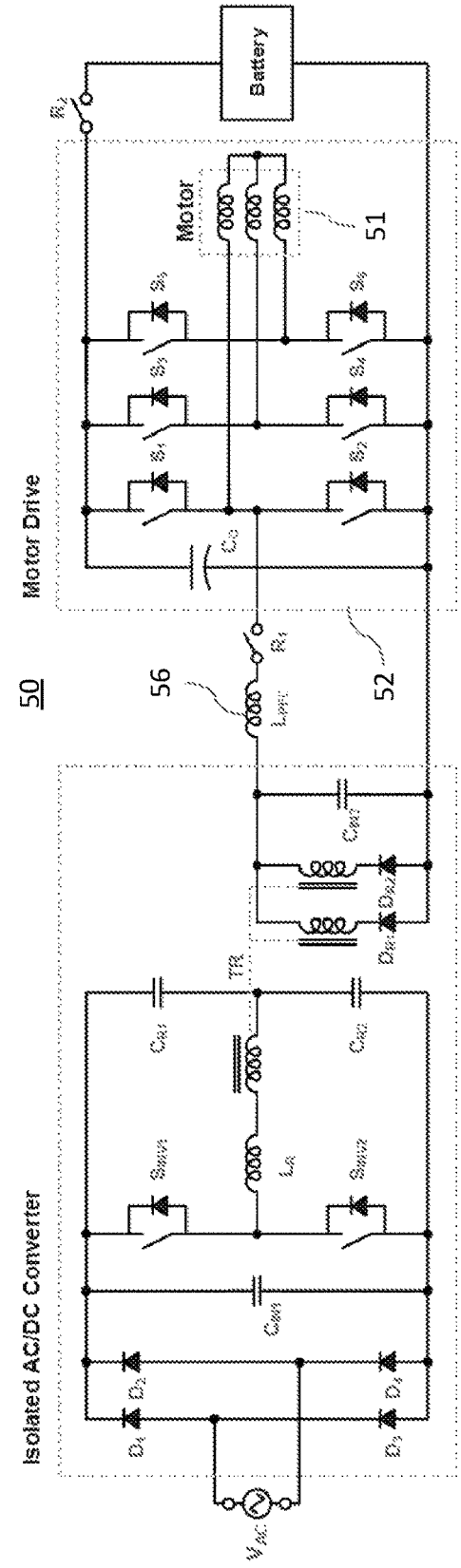
FIG. 5A illustrates an electric system of an electric vehicle having a motor drive integrated on-board charger in accordance with a second embodiment of the present disclosure.

FIG. 5A illustrates an electric system 50 of an electric vehicle having a motor drive integrated on-board charger in accordance with a second embodiment of the present disclosure. Electric system 50 in FIG. 5A is substantially identical to electric system in FIG. 4A, except that electric system 50 additionally includes an external PFC choke 56 to draw current from inpes capacitor $C_{IN2}$, instead of the three motor windings connected in parallel. In addition, a three phase motor 51 is connected differently than motor 41 in FIG. 4A and is considered as a part of a motor drive 52 including three phase motor 51, switches $S_1$, $S_2$, $S_3$, $S_4$, $S_5$, and $S_6$, and link capacitor $C_O$. In this configuration, the first motor drive inverter phase leg, including switches $S_1$ and $S_2$, is solely responsible for regulating current through an external power factor correcting (PFC) inductor $L_{PFC}$. In the embodiment, the PFC inductor $L_{PFC}$ includes a boost inductor. Because three-phase motor 51 is still connected, the other two phase legs operate at the same duty cycle to keep motor winding currents at zero. The benefit of the approach shown in FIG. 5A compared to the approach in FIG. 4A is that there is no need to access the motor neutral terminal. In some embodiments, there might be the need for an additional inductor conversely.

Figure 5B:
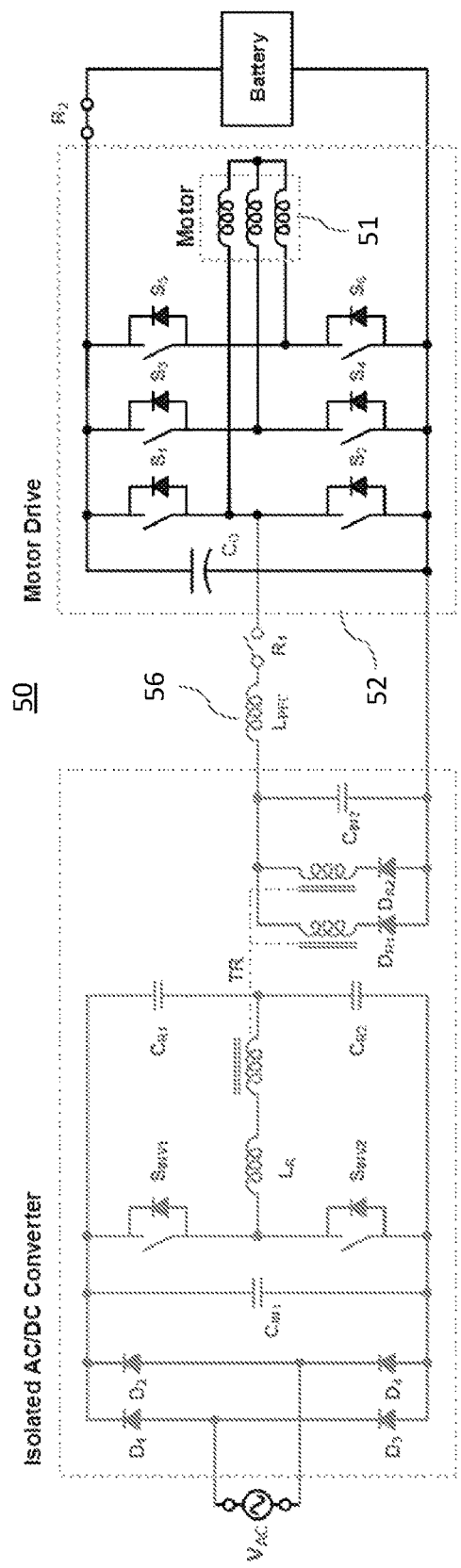
FIGS. 5B and 5C respectively illustrate the driving mode and the battery charging mode of the motor drive integrated on-board charger as shown in FIG. 5A.
Figure 5C:
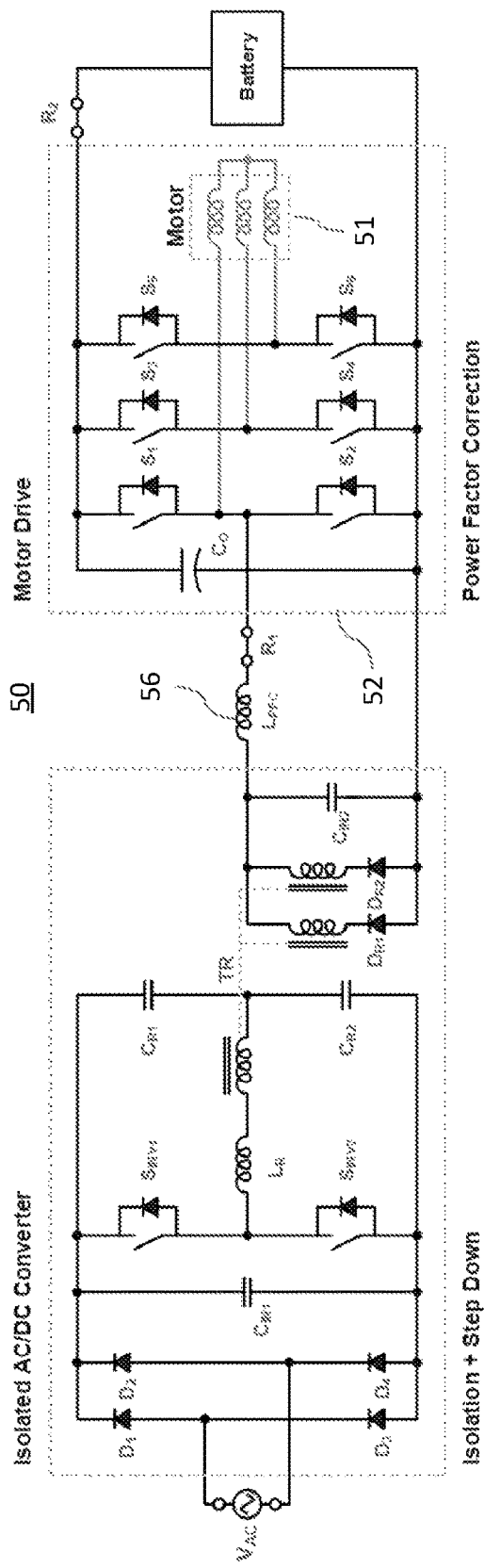

FIGS. 5B and 5C respectively illustrate the driving mode and the battery charging mode of the motor drive integrated on-board charger as shown in FIG. 5A. In the driving mode, as shown in FIG. 5B, relay $R_1$ is opened and relay $R_2$ is closed, such that the battery is connected to motor 51 and motor driving inverter 4252 and that isolated AC/DC converter is turned off. It can be noted that the electrical connection of electric system 50 in FIG. 5B, is substantially identical as the electrical connection of that shown in FIG. 2B. In the charging mode, as shown in FIG. 5C, both relays $R_1$ and $R_2$ are closed, such that electric energy can flow from the AC power input to the battery.

In the driving mode, as shown in FIG. 5B, electric system 50 operates as a motor drive equivalent to that shown in FIGS. 3B and 4B. In the charging mode, the motor drive integrated on-board charger as shown in FIG. 5C offers simple control. Because input capacitor $C_{IN1}$ is relatively small, the voltage across it is the rectified version of input voltage $V_{AC}$. Input capacitor $C_{IN1}$ sets the voltage across the LLC resonant converter. The resonant converter operates at 50% duty cycle, constant switching frequency, and scales down the voltage across input capacitor $C_{IN1}$ to a lower value due to the lower number of turns on the secondary winding of transformer $T_R$, as compared to the number of turns on the primary winding. The LLC converter switching frequency is based on battery voltage, battery current, and input voltage $V_{AC}$ to provide an appropriate level of AC voltage to input-capacitor $C_{IN2}$. Similar to input capacitor $C_{IN1}$, capacitor $C_{IN2}$ also has a small value. As a result, voltage across input-capacitor $C_{IN2}$ is likewise a scaled-down rectifier input voltage $V_{AC}$. Because there is no significant energy storage in the AC/DC converter, both capacitor voltages follow the shape of input voltage $V_{AC}$. Such a system can be described to have soft DC links as opposed to systems that use a larger capacitance value to hold the DC link at a quasi-constant value, such as electric system 20 in FIG. 2A.

The first phase motor driving inverter phase leg is controlled such that the current drawn from PFC inductor $L_{PFC}$ follows the shape of the voltage across input-capacitor $C_{IN2}$. Therefore, if the voltage across input-capacitor $C_{IN2}$ is zero, no current is drawn from it. As a result, the voltage and current waveforms on the output side of the AC/DC converter are both rectified sinusoids of the same frequency and alignment. Because there is no significant energy storage in the AC/DC converter, input power is equal to output power. It follows that the input current of the AC/DC converter is also a rectified sinewave. Thus, the input current drawn from the grid is of the same shape and angle as input voltage $V_{AC}$. The presented converter therefore yields the power factor correction property.

Further, the first motor winding remains connected to the first phase inverter phase leg. To maintain zero current through motor windings, the second and third motor drive inverter phase legs are either modulated with the same duty cycle as the first motor inverter phase leg or all switches in the second and third phase inverter legs are turned off. Since the current in motor windings is zero, the configuration shown in FIG. 5C produces no torque.

FIG. 6A illustrates an electric system 60 of an electric vehicle having a motor drive integrated on-board charger in accordance with a third embodiment of the present disclosure. In this embodiment, electric system 60 uses a single-pole double-throw relay $R_1$ to connect the AC terminal (point A) of the first motor drive inverter phase leg (including switches $S_1$ and $S_2$) either to the first motor winding of motor 61 or to external PFC inductor $L_{PFC}$. A second single-pole double throw relay $R_2$ is used to connect the positive terminal of a battery 63 either to the positive terminal (point B) of the motor drive inverter DC link or to the first motor winding of motor 61.

Figure 6C:
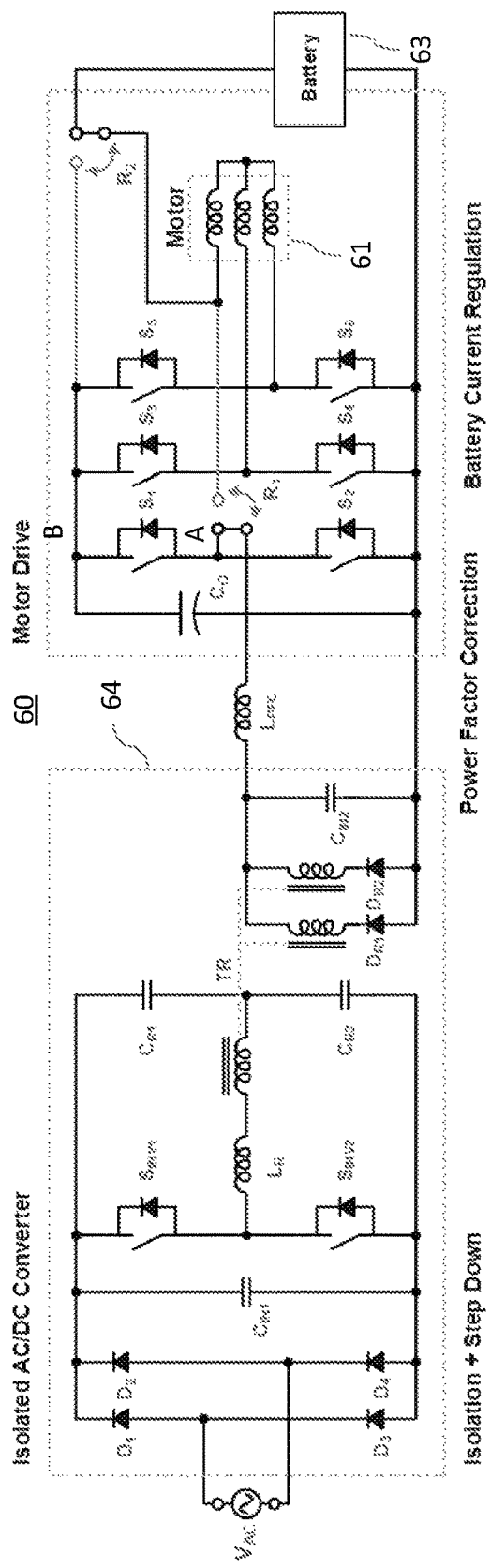

FIGS. 6B and 6C respectively illustrate the driving mode and the battery charging mode of the motor drive integrated on-board charger as shown in FIG. 6A. In the driving mode, as shown in FIG. 6B, relay $R_1$ connects the AC terminal (point A) of the first motor drive inverter phase leg to the first motor winding, and relay $R_2$ connects the positive terminal of battery 63 to the positive terminal (point B) of the motor drive inverter DC link. Isolated AC/DC converter 64 is turned off. This configuration is electrically and functionally equivalent to the ones shown in FIGS. 3B, 4B, and 5B.

In the battery charging mode, as shown in FIG. 6C, relay $R_1$ connects the AC terminal (point A) of the first motor drive inverter phase leg (including switches $S_1$ and $S_2$) to external PFC inductor $L_{PFC}$ and relay $R_2$ connects the positive terminal of battery 63 to the first motor winding of motor 61. This configuration is redrawn in FIG. 6D for clarity. The primary difference between this and previous circuit configurations shown in FIGS. 4C and 5C is that the configuration in FIGS. 6C and 6D absorbs the pulsating input power from voltage source $V_{AC}$ within the DC link.

Figure 6D:
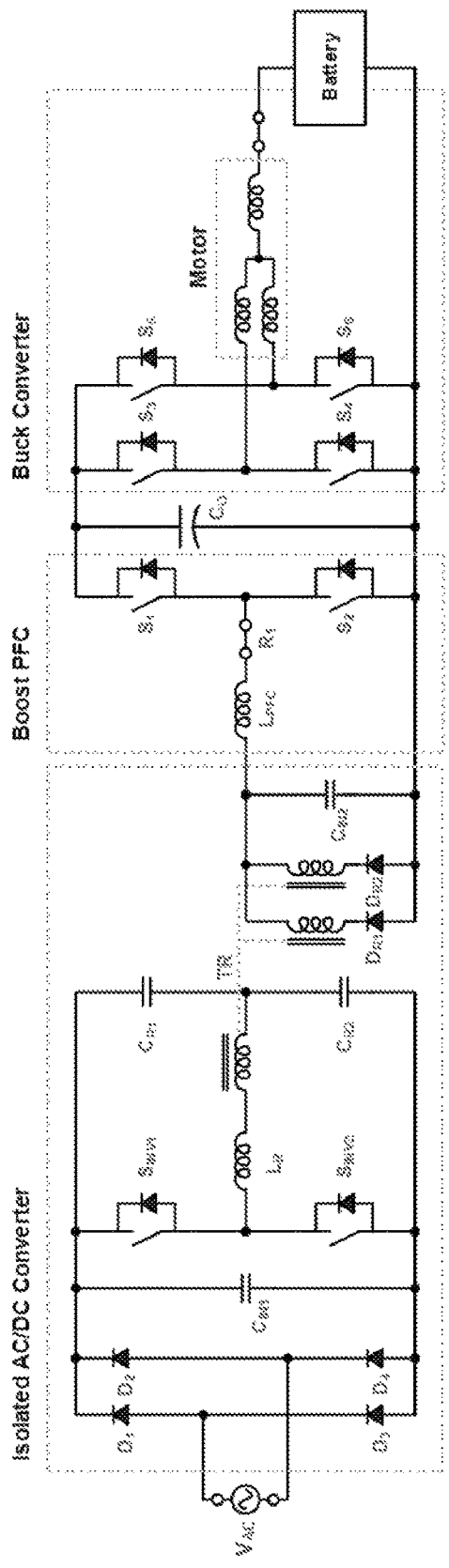
FIG. 6D shows a simplified version of FIG. 6C for greater clarity.

The LLC converter switching frequency is based on battery voltage, battery current, and input voltage $V_{AC}$ to provide an appropriate level of AC voltage to input-capacitor $C_{IN2}$. As shown in FIGS. 6C and 6D, the first motor drive inverter phase leg operates as a boost PFC. In this configuration, the first motor drive inverter phase leg, including switches $S_1$ and $S_2$, is solely responsible for regulating current through the external PPC inductor $L_{PFC}$. The PFC inductor $L_{PFC}$ current reference follows the shape of the voltage across capacitor $C_{IN2}$. As stated above, voltage across capacitor $C_{IN2}$ is a rectified sine wave. Thus, if voltage across input capacitor $C_{IN2}$ is zero, there is no current being drawn from the capacitor. As a result, the voltage and current waveforms on the output side of the AC/DC rectifier are both rectified sinusoids of the same frequency and alignment. As there is no significant energy storage in the AC/DC rectifier, input power of the isolated AC/DC converter is equal to its output power. It follows that the input current of the AC/DC rectifier is also a rectified sinewave. Thus, the input current drawn from the grid is of the same shape and angle as input voltage $V_{AC}$. The presented converter therefore yields a power factor correction property.

Moreover, the second and third motor drive inverter phase legs are connected to the second and third motor windings of motor 61, while the first motor winding is connected to the positive terminal of battery 63. The three motor windings remain connected at their neutral point. As a result, the second and third motor drive inverter phase legs and motor 61 constitute an interleaved buck converter. A buck converter, also called a step-down converter, has continuous output current, because the inductive elements are connected at the output. Consequently, battery charging current can be easily regulated to a constant value with minimal ripple. Therefore, the circuit configuration shown in FIGS. 6C and 6D provides both PFC capability at the input and DC current regulation at the output. The discrepancy between the fluctuating input power and constant output power is provided by existing DC link capacitor $C_O$.

Even though currents in motor windings connected to the second and third inverter legs are equal in magnitude and polarity and current in the remaining winding has twice the magnitude and opposing polarity, the use of motor windings in a configuration shown in FIGS. 6C and 6D produces no low-frequency pulsating torque, because all windings carry DC currents with a very small and high frequency ripple. The ripple current is inversely proportional to both motor inductance and switching frequency.

Figure 7A:
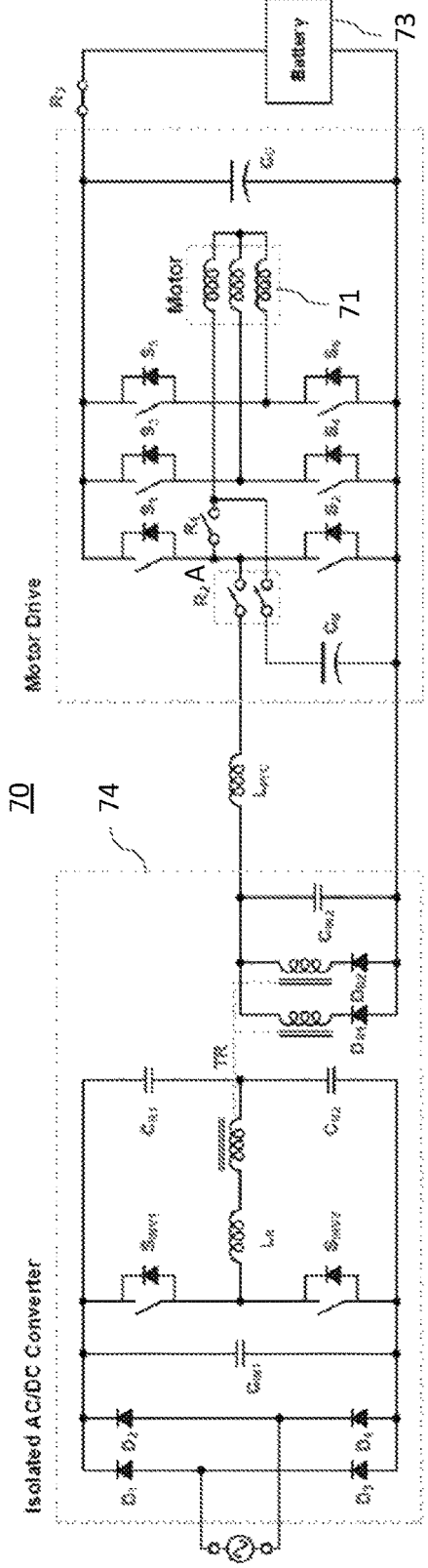
FIG. 7A illustrates an electric system of an electric vehicle having a motor drive integrated on-board charger in accordance with a fourth embodiment of the present disclosure.

FIG. 7A illustrates an electric system 70 of an electric vehicle having a motor drive integrated on-board charger in accordance with a fourth embodiment of the present disclosure. In this embodiment, a single-pole single-throw relay $R_1$ connects or disconnects the AC terminal (point A) of the first motor drive inverter phase leg (including switches $S_1$ and $S_2$) to the first motor winding of motor 71. Further, a double-pole double-throw relay $R_2$ connects or disconnects the AC terminal (point A) of the first motor drive inverter phase leg to external PFC inductor $L_{PFC}$ and also connects or disconnects the first motor winding to a buffer capacitor $C_B$.

Figure 7B:
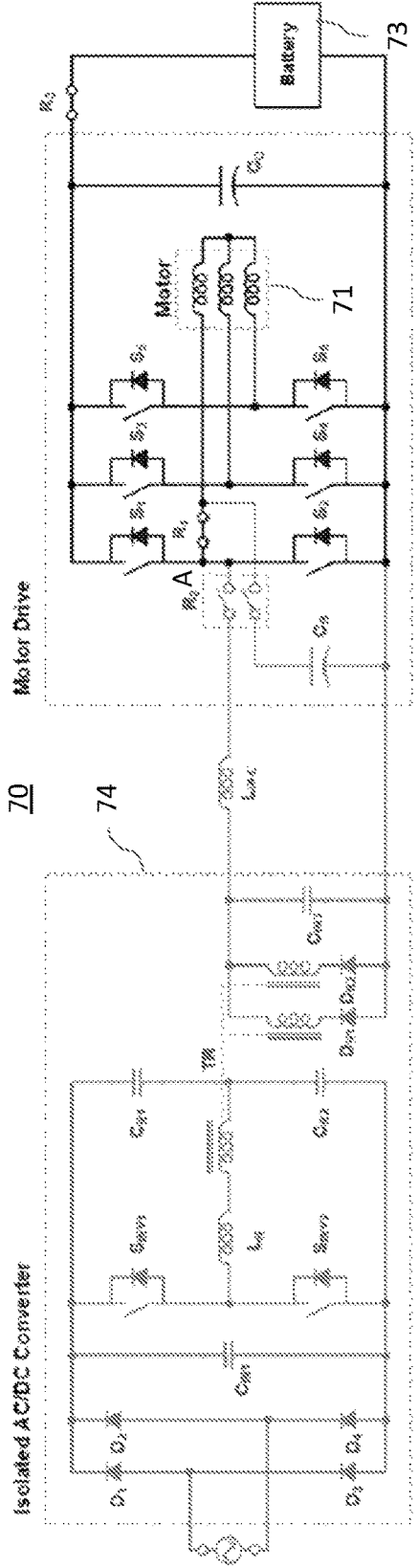
FIGS. 7B and 7C respectively illustrate the driving mode and the battery charging mode of the motor drive integrated on-board charger as shown in FIG. 7A.
Figure 7C:
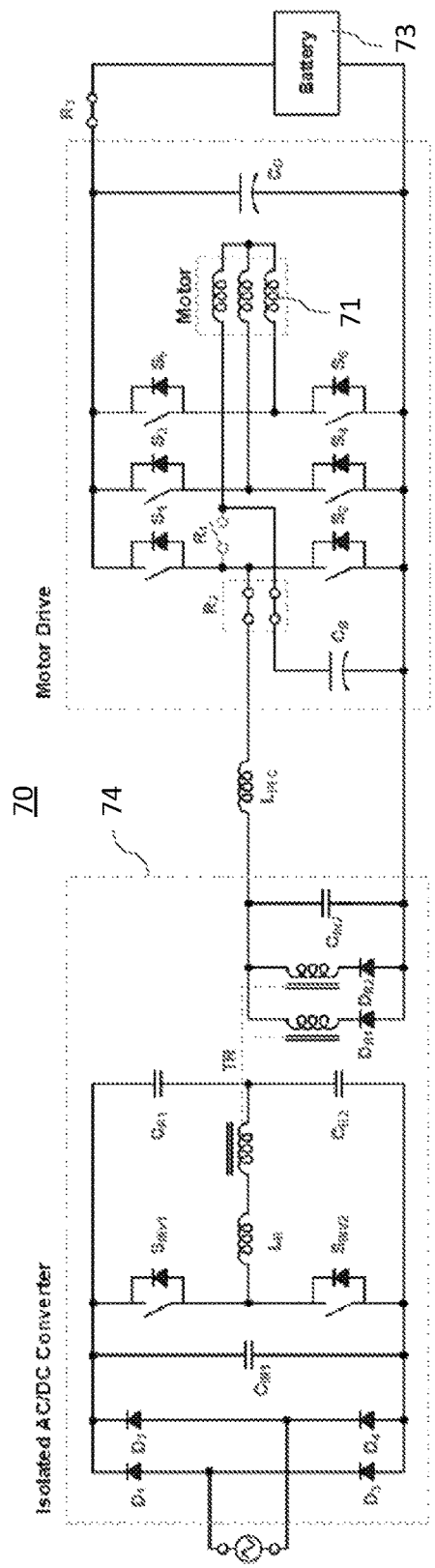

FIGS. 7B and 7C respectively illustrate the driving mode and the battery charging mode of the motor drive integrated on-board charger as shown in FIG. 7A. In the driving mode, as shown in FIG. 7B, relay $R_1$ and relay $R_3$ are closed while relay $R_2$ is open. The AC terminal (point A) of the first motor drive inverter phase leg is connected to the first motor winding of motor 71. The isolated AC/DC converter is turned off. This configuration is electrically and functionally equivalent to the ones shown in FIGS. 3B, 4B, 5B, and 6B.

In the battery charging mode, as shown in FIG. 7C, relay $R_1$ is open while relay $R_2$ and relay $R_3$ are closed. Relay $R_2$ connects the AC terminal (point A) of the first motor drive inverter phase leg to external PFC inductor $L_{PFC}$ and also connects the first motor winding of motor 71 to buffer capacitor $C_B$. This configuration is redrawn in FIG. 7D for clarity. The primary difference between this and previous circuit configurations shown in FIGS. 4C, 5C, and 6C is that the configuration in FIGS. 7C and 7D absorbs the pulsating input power from voltage source $V_{AC}$ within buffer capacitor $C_B$.

Figure 7D:
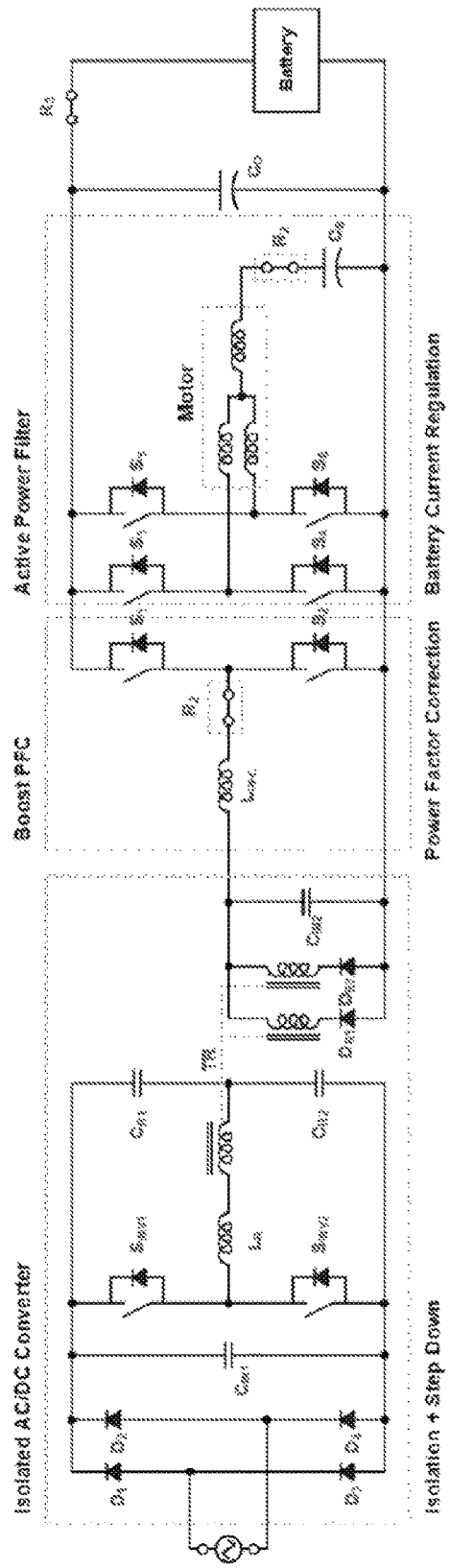
FIG. 7D shows a simplified version of FIG. 7C for greater clarity.

The LLC converter switching frequency is based on battery voltage, battery current, and input voltage $V_{AC}$ to provide an appropriate level of AC voltage to capacitor $C_{IN2}$. As shown in FIGS. 7C and 7D, the first motor drive inverter phase leg operates as a boost PFC. In this configuration, the first motor drive inverter phase leg, including switches $S_1$ and $S_2$, is solely responsible for regulating current through the external PFC inductor $L_{PFC}$. The PFC inductor $L_{PFC}$ current reference follows the shape of the voltage across capacitor $C_{IN2}$. As stated above, voltage across capacitor $C_{IN2}$ is a rectified sine wave. Thus, if voltage across capacitor $C_{IN2}$ is zero, there is no current being drawn from the capacitor. As a result, the voltage and current waveforms on the output side of the AC/DC rectifier are both rectified sinusoids of the same frequency and alignment. As there is no significant energy storage in the AC/DC rectifier, input power of the isolated AC/DC converter is equal to its output power. It follows that the input current of the AC/DC rectifier is also a rectified sinewave. Thus, the input current drawn from the grid is of the same shape and angle as input voltage $V_{AC}$. The presented converter therefore yields a power factor correction property.

Moreover, the second and third motor drive inverter phase legs are connected to the second and third motor windings of motor 71, while the first motor winding is connected to buffer capacitor $C_B$. The three motor windings remain connected at their neutral point. Thus, the second and third motor drive inverter phase legs and motor 71 constitute an interleaved buck converter. A buck converter, also called a step-down converter, has continuous output current because the inductive elements are connected at the output. The combination of the buck converter and buffer capacitor $C_B$ constitutes an active power filter (APF).

By definition, an active power filter can only provide AC power. Thus, the active power filter can provide AC power that is of equal magnitude and opposite polarity as the PFC circuit, which provides both DC and AC power. As a result, the AC component of the PFC circuit is effectively cancelled at the battery terminal, which results in low or no battery current ripple. When the energy delivered by the boost PFC is excessive, energy is drawn from link capacitor $C_O$ and stored in buffer capacitor $C_B$. On the other hand, when the energy delivered by the boost PFC is insufficient, energy is drawn from buffer capacitor $C_E$ and delivered to link capacitor $C_O$. By doing so, the output current can be regulated to be constant. Therefore, the circuit configuration shown in FIGS. 7C and 7D provides both PFC capability at the input and low battery current ripple.

It also should be noted that the configuration of the embodiment shown in FIGS. 7C and 7D does not break the DC link connection to battery 73. Thus, capacitors and switches do not need to support slightly elevated voltage levels as in configuration shown in FIGS. 6C and 6D. Furthermore, even though winding phase A and phase B currents are equal in magnitude and polarity and winding phase C current has twice the magnitude and opposing polarity, the use of motor windings in a configuration shown in FIGS. 7C and 7D produces no pulsating torque because all windings carry DC currents with a very small and high frequency ripple. The ripple current is inversely proportional to both motor inductance and switching frequency.

Figure 7E:
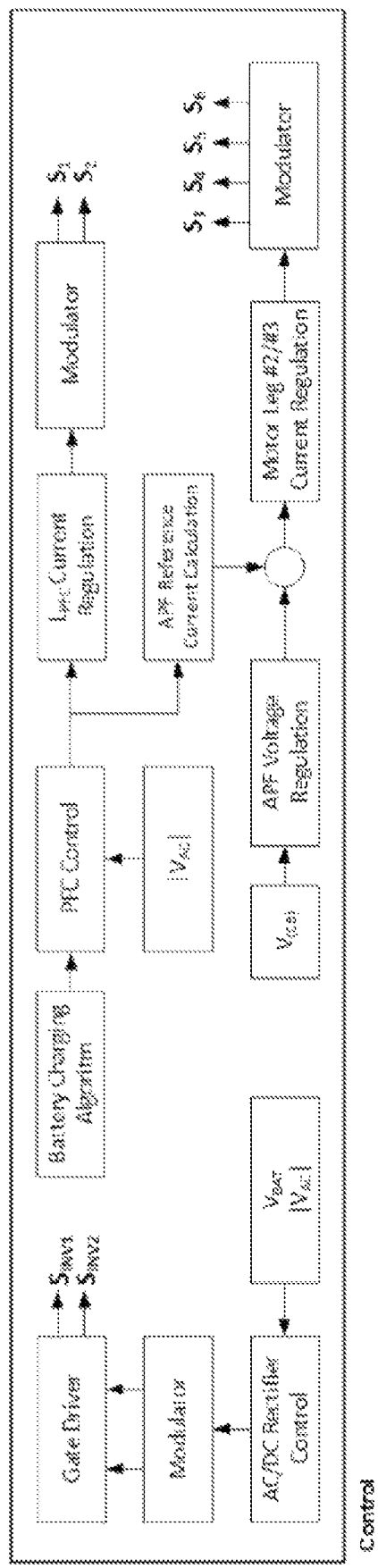
FIG. 7E shows a control diagram for the converter in FIGS. 7C and 7D.

FIG. 7E shows a control diagram for the converter in FIGS. 7C and 7D. As shown in FIG. 7E, the control of the circuit in FIGS. 7C and 7D is based on two current loops and one voltage loop. The first current loop regulates the current flowing through PFC inductor $L_{PFC}$ to follow the same shape as the voltage across capacitor $C_{IN2}$. The circuit therefore achieves a PFC capability. The second current loop regulates the APF current to effectively cancel out the AC ripple delivered by the PFC circuit. In the embodiment, the APF capacitor voltage needs to be balanced at a nominal point, which allows the APF circuit to either provide or absorb the necessary power. This is the remaining voltage loop. The voltage loop is designed to be reasonably slow, at about 10 Hz cross-over frequency, such that it does not interact with the much faster APF current loop.

FIGS. 8A, 8B, 8C, and 8D illustrate an electric system of an electric vehicle having a motor drive integrated on-board charger with topological variations of the isolated AC/DC rectifier. In this disclosure, only series resonant converter topologies are shown for simplicity. It should be noted that any kind of resonant topologies can be used as the isolated AC/DC rectifier stage. The configuration of motor and motor driving inverter following the rectifier can be one of the configurations in FIGS. 4 through 7.

Figure 8C:
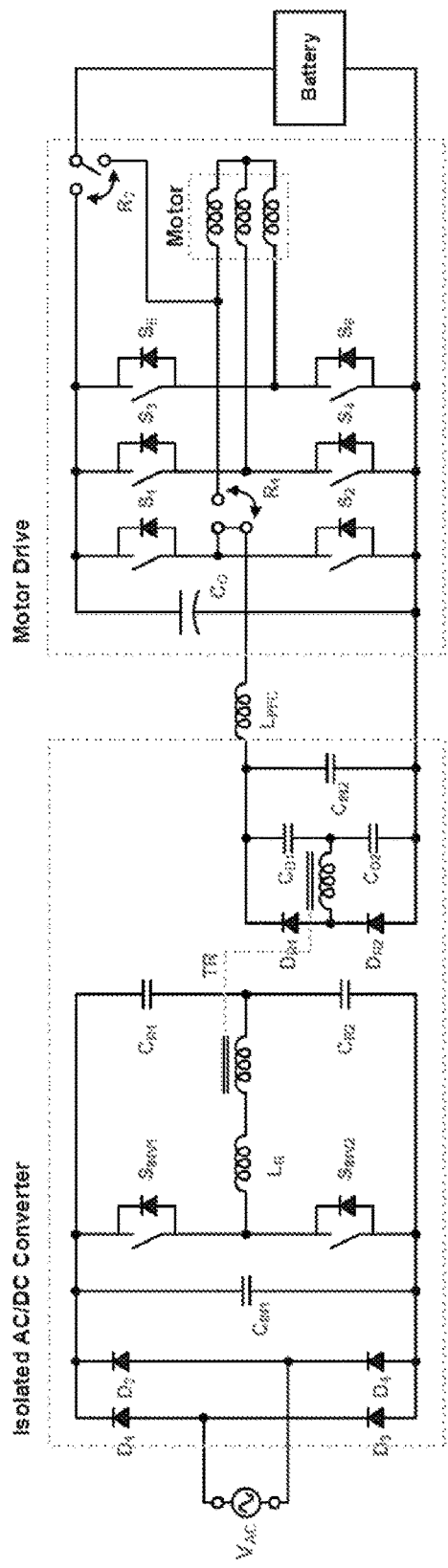
Figure 8D:
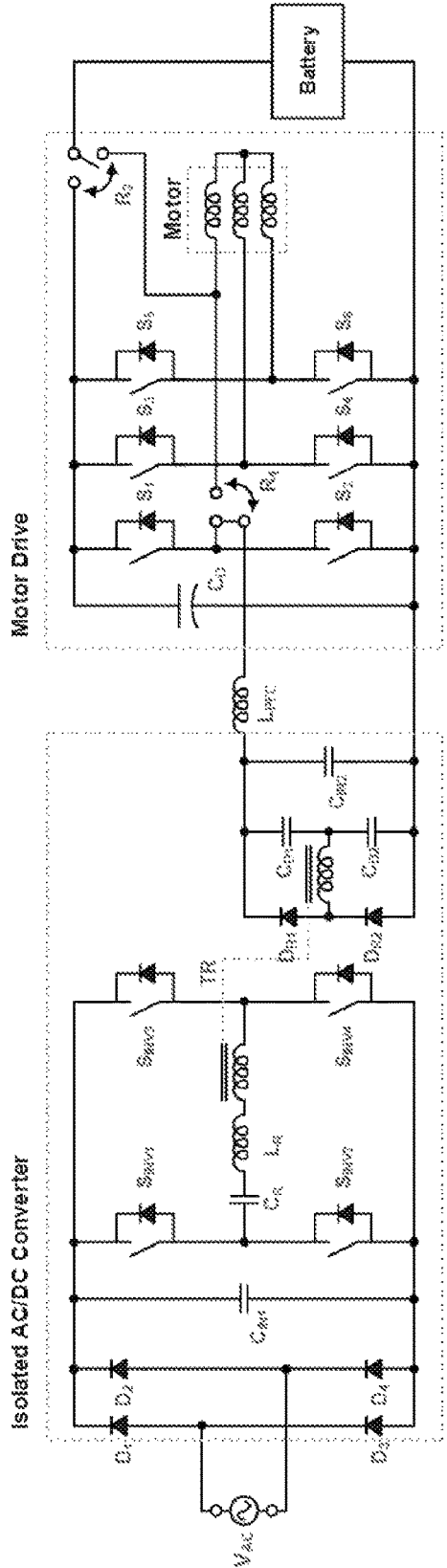

FIG. 8A illustrates a motor drive integrated on-board charger with an isolated AC/DC rectifier with a half bridge inverter and a full bridge rectifier. FIG. 8B illustrates motor drive integrated on-board charger with an isolated AC/DC rectifier with a full bridge inverter and a full bridge rectifier. FIG. 8C illustrates motor drive integrated on-board charger with an isolated AC/DC rectifier with a half bridge inverter and a voltage doubler rectifier. FIG. 8D illustrates motor drive integrated on-board charger with an isolated AC/DC rectifier with a full bridge inverter and a voltage doubler rectifier.

Figure 9A:
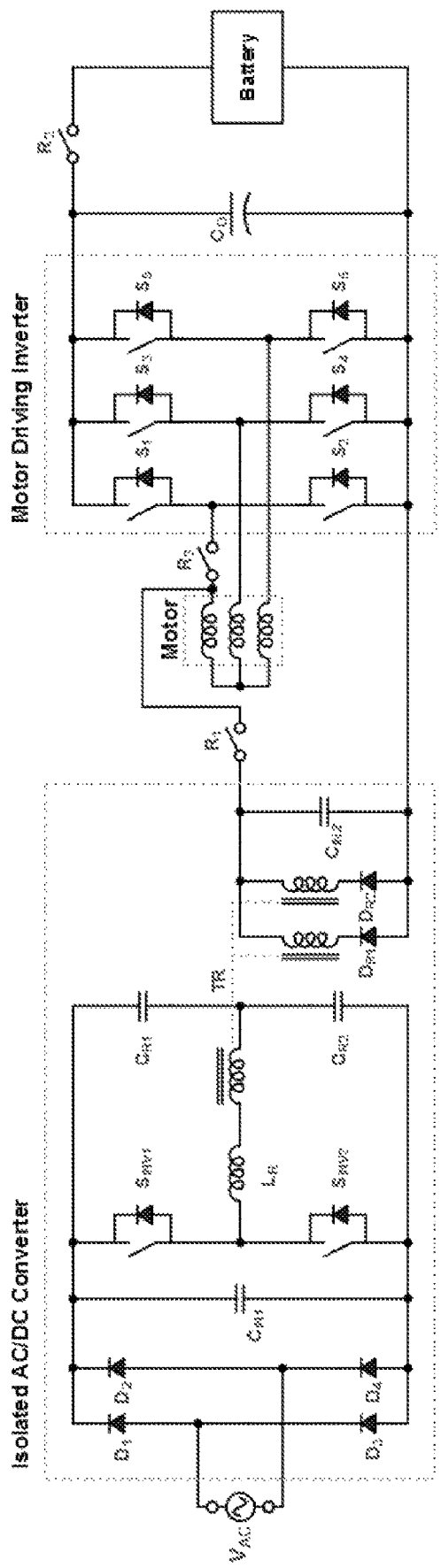
FIG. 9A illustrates an electric system of an electric vehicle having a motor drive integrated on-board charger in accordance with a first embodiment of the present disclosure.

FIG. 9A illustrates an electric system of an electric vehicle having a motor drive integrated on-board charger in accordance with a fifth embodiment of the present disclosure. As shown, the electric system includes a motor, a motor driving inverter, a battery, an isolated AC/DC converter, and an external AC power input. In one embodiment, the motor is a three phase motor including three motor windings with one of the motor windings being connected together at a neutral point.

The isolated AC/DC converter includes rectifier diodes $D_1$, $D_2$, $D_3$, and $D_4$, input capacitor $C_{IN1}$, and an LLC converter. The LLC converter includes two switches $S_{INV1}$ and $S_{INV2}$, a resonant inductor $L_R$, resonant capacitors CRI and $C_{R2}$, a transformer $T_R$, rectifier diodes $D_{R1}$ and $D_{R2}$, and a capacitor $C_{IN2}$. The capacitor $C_{IN2}$ is connected to the first phase winding point of motor through a relay $R_1$. The same winding is connected to the first phase leg of the motor driving inverter through a relay $R_3$. The motor driving inverter may include switches $S_1$, $S_2$, $S_3$, $S_4$, $S_5$, and $S_6$. Each end of the motor windings of the motor opposing the neutral point is connected to two of switches $S_1$, $S_2$, $S_3$, $S_4$, $S_5$, and $S_6$ of the motor driving inverter. The motor driving inverter is connected in parallel with a link capacitor $C_O$, while battery is connected across the link capacitor $C_O$, through a relay $R_2$. Compared to the conventional system in FIG. 2A, the converter of the embodiment in FIG. 9A does not include PFC inductor $L_{PFC}$, boost switch $S_{B1}$, diode $D_5$, and capacitor $C_{O,PFC}$, thereby reducing the cost of the system.

Figure 9B:
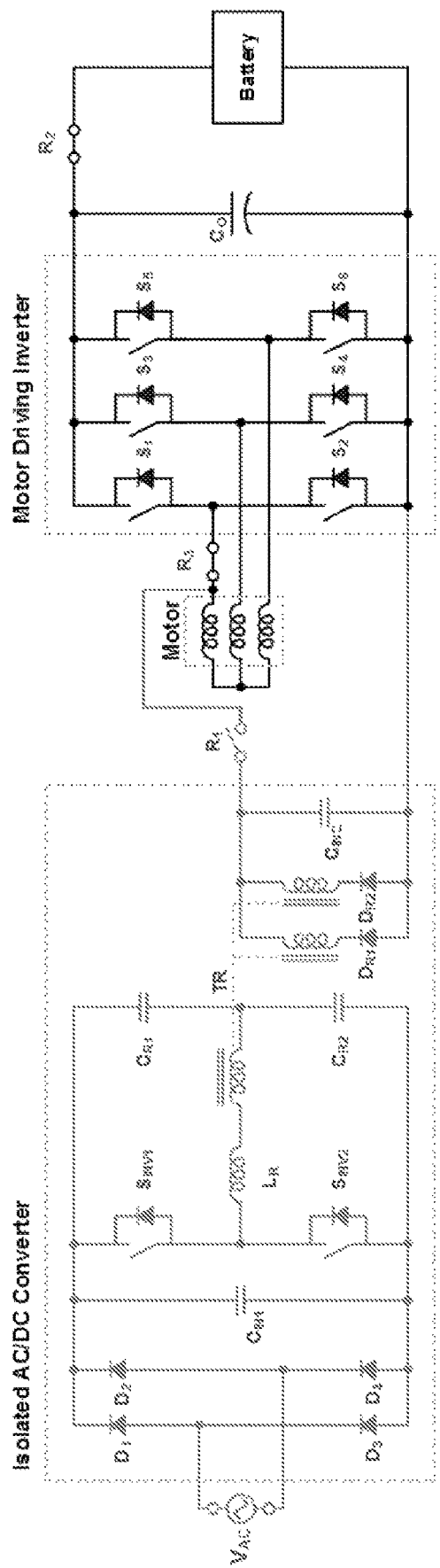
FIGS. 9B and 9C respectively illustrate the driving mode and the battery charging mode of the motor drive integrated on-board charger of the embodiment as shown in FIG. 9A.
Figure 9C:
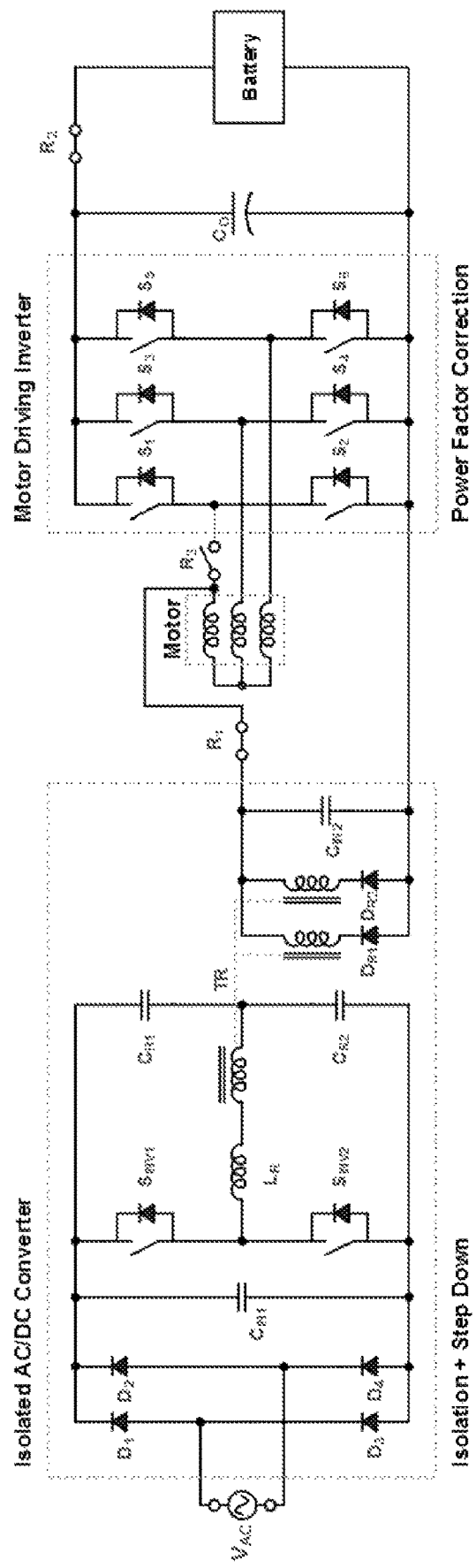

FIGS. 9B and 9C respectively illustrate the driving mode and the battery charging mode of the motor drive integrated on-board charger of the embodiment as shown in FIG. 9A. In the driving mode, as shown in FIG. 9B, relay $R_1$ is opened and relays $R_2$ and $R_3$ are closed, such that the battery is connected only to the motor and the motor driving inverter and that the isolated AC/DC converter is turned off. It can be noted that the electrical connection of the electric system in FIG. 9B, is substantially identical as the electrical connection of that shown in FIG. 2B. In the charging mode, as shown in FIG. 9C, both relays $R_1$ and $R_2$ are closed and relay $R_3$ is open, such that electric energy can flow from AC power input to battery. It can be noted that both the motor and the motor driving inverter become a part of the charging system. In contrast, the motor and the motor driving inverter are not used during the charging mode in electric system of FIG. 2B.

In this embodiment, in the charging mode, the LLC converter in the isolated AC/DC converter is used as an AC/DC rectifier and provides isolation and scaling of AC power input. The switching frequency of the LLC converter may be varied from one half to five times the resonant frequency determined by the resonant tank components $L_R$, $C_{R1}$, and $C_{R2}$. It can be noted that the switching frequency is much higher than the AC input line frequency (e.g., 60 Hz). Therefore, the voltage across the resonant-capacitor $C_{IN2}$ becomes a scaled absolute value of the AC input line voltage $V_{AC}$. The motor driving inverter and the three windings of the motor may be considered as two independent boost converters connected in parallel and operate as a composite boost power factor correction circuit with the first motor winding being in series with the second and third motor windings. Since the relay $R_3$ is open, the first phase leg is inactive. By doing so, the circuit in FIG. 9C can provide isolation and power factor correction with a reduced number of components. Electric system of FIG. 9C, however, has a large ripple in the charging current due to the output voltage ripple of the PFC circuit. Therefore, the electric system of FIG. 9C may be applicable to systems where such a battery current ripple is acceptable. Compared to the system shown in FIG. 4, the embodiment employs a relay $R_3$ but does not need to access the motor winding neutral point.

One advantage of the motor drive integrated on-board charger as shown in FIG. 9C is that it offers simple control. Because the input capacitor $C_{IN1}$ is relatively small, the voltage across it is the rectified version of input voltage $V_{AC}$. The input capacitor $C_{IN1}$ sets the voltage across the LLC resonant converter. The resonant converter operates at 50% duty cycle, constant switching frequency, and scales down the voltage across input capacitor $C_{IN1}$ to a lower value due to the lower number of turns on the secondary winding of transformer $T_R$ as compared to the number of turns on the primary winding. The LLC converter switching frequency may be based on battery voltage, battery current, and input voltage $V_{AC}$ to provide an appropriate level of AC voltage to capacitor $C_{IN2}$. Similar to the input capacitor $C_{IN1}$, the capacitor $C_{IN2}$ also has a small value. As a result, the voltage across capacitor $C_{IN2}$ is likewise a scaled-down rectifier input voltage $V_{AC}$. Because there is no significant energy storage in AC/DC converter, both capacitor voltages follow the shape of the input voltage $V_{AC}$. Such a system can be described to have soft DC links as opposed to systems that use a larger capacitance value to hold the DC link at a quasi-constant value, such as, the electric system of FIG. 2A.

The second and third phase motor driving inverter phase legs are controlled such that the currents drawn by the second and third motor winding are equal to each other. The sum of these two currents is the current in the first motor winding. The motor winding current reference follows the shape of the voltage across capacitor $C_{IN2}$. As stated above, voltage across the capacitor $C_{IN2}$ is a rectified sine wave. Thus, if the voltage across the capacitor $C_{IN2}$ is zero, no current is drawn from it. As a result, the voltage and current waveforms on the output side of the AC/DC converter are both rectified sinusoids of the same frequency and alignment. As there is no significant energy storage in the AC/DC converter, input power is equal to output power. It follows that the input current of the AC/DC converter is also a rectified sinewave. Thus, the input current drawn from the grid is of the same shape and angle as the input voltage $V_{AC}$. The presented converter therefore yields the power factor correction property. The magnitude of the phase winding current reference is dependent on the battery charging algorithm. When the battery is depleted, the current reference magnitude would be at its maximum value supported by the converter power processing capability. As the battery state-of-charge approaches maximum, the magnitude of the current reference would gradually decrease to zero.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed modified by a term of degree (e.g., "about"), thereby reflecting its intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

The invention claimed is:

1. An electric system of an electric vehicle, comprising:
   an AC/DC converter;
   a motor drive comprising a motor and an inverter;
   a power factor correcting (PFC) inductor electrically connected between the AC/DC converter and the motor drive;
   a link capacitor connected in parallel with the motor drive;
   a first relay connected between the PFC inductor and the motor drive; and
   a second relay through which a battery is connected to the link capacitor.

2. The electric system of claim 1, wherein the motor comprises a plurality of phases, and the inverter comprises a plurality of phase legs, each first end of the phases being connected to a respective one of the phase legs.

3. The electric system of claim 2, wherein second ends of the phases are connected at a neutral point.

4. The electric system of claim 2, wherein the PFC inductor is connected to a selected one of the phase legs through the first relay.

5. The electric system of claim 2, wherein each of the phase legs comprises two switches and the PFC inductor is connected to a terminal between the two switches of a selected one of the phase legs through the first relay.

6. The electric system of claim 1, wherein in a driving mode, the first relay is opened and the second relay is closed, and the battery is capable of being discharged to power the motor; and/or in a charging mode, the first relay and the second relay are closed, and the battery is capable of being charged using an AC power source.

7. The electric system of claim 1, wherein the AC/DC converter comprises a resonant converter, capable of receiving an AC power source at an input terminal and generating a DC power at an output terminal.

8. The electric system of claim 1, wherein the AC/DC converter comprises one of an isolated AC/DC rectifier having a half bridge inverter and a full bridge rectifier, an isolated AC/DC rectifier having a full bridge inverter and a full bridge rectifier, an isolated AC/DC rectifier having a half bridge inverter and a voltage doubler rectifier, and an isolated AC/DC rectifier having a full bridge inverter and a voltage doubler rectifier.

9. An electric system of an electric vehicle, comprising:
   an AC/DC converter;
   a motor drive including a motor and an inverter, wherein the motor comprises a plurality of phases and the inverter comprises a plurality of phase legs, each of the phases being connected to a respective one of the phase legs;
   a power factor correcting (PFC) inductor electrically connected between the AC/DC converter and the motor drive;
   a link capacitor connected in parallel with the motor drive;
   a first relay configured to selectively connect a selected one of the phase legs either to a respective one of the phases of the motor or to the PFC inductor; and
   a second relay configured to selectively connect a battery either to a positive terminal of the inverter or to said respective one of the phases of the motor.

10. The electric system of claim 9, wherein each of the phase legs comprises two switches and the first relay is connected between the PFC inductor and a terminal between the two switches of said selected one of the phase legs.

11. The electric system of claim 10, wherein one ends of the phase legs are connected together at a neutral point.

12. The electric system of claim 9, wherein in a driving mode, the first relay connects said selected one of the phase legs to said respective one of the phases of the motor, the second relay connects the battery to the positive terminal of the inverter, and the battery is capable of being discharged to power the motor; and/or in a charging mode, the first relay connects said selected one of the phase legs to the PFC inductor, and the second relay connects the battery to said respective one of the phases of the motor, and the battery is capable of being charged using an AC power source.

13. The electric system of claim 9, wherein the AC/DC converter comprises a resonant converter, capable of receiving an AC power source at an input terminal and generating a DC power at an output terminal.

14. The electric system of claim 9, wherein the AC/DC converter comprises one of an isolated AC/DC rectifier having a half bridge inverter and a full bridge rectifier, an isolated AC/DC rectifier having a full bridge inverter and a full bridge rectifier, an isolated AC/DC rectifier having a half bridge inverter and a voltage doubler rectifier, and an isolated AC/DC rectifier having a full bridge inverter and a voltage doubler rectifier.

15. An electric system of an electric vehicle, comprising:
   an AC/DC converter;
   a motor drive including a motor and an inverter, wherein the motor comprises a plurality of phases and the inverter comprises a plurality of phase legs, each of the phases being connected to a respective one of the phase legs;
   a power factor correcting (PFC) inductor electrically connected between the AC/DC converter and the motor drive;
   a link capacitor connected in parallel with the motor drive;
   a first relay connected between a selected one of the phase legs and a respective one of the phases;
   a second relay configured to connect or disconnect said selected one of the phase legs with the PFC inductor and configured to connect or disconnect said respective one of the phases with a buffer capacitor; and
   a third relay through which a battery is connected to the link capacitor.

16. The electric system of claim 15, wherein the second relay comprises a double-pole double-throw relay.

17. The electric system of claim 15, wherein in a driving mode, the first and third relays are closed and the second relay is opened, and the battery is capable of being discharged to power the motor; and/or in a charging mode, the second and third relays are closed and the first relay is opened, and the battery is capable of being charged using an AC power source.

18. An electric system of an electric vehicle, comprising:
an AC/DC converter capable of receiving an AC power source at an input terminal of the AC/DC converter and providing a DC power at an output terminal of the AC/DC converter;
a first relay electrically connected to the output terminal of the AC/DC converter;
a motor connected to the AC/DC converter through the first relay and comprising a plurality of phase legs with one end of the phase legs being connected at a neutral point, wherein the first relay is connected to the neutral point;
a motor driving inverter connected to the motor;
a link capacitor connected in parallel with the motor driving inverter; and
a second relay through which the link capacitor is connected to a battery.

19. The electric system of claim 18, wherein in a driving mode, the first relay is opened and the second relay is closed, and the battery is capable of being discharged to power the motor; and/or in a charging mode, the first relay and the second relay are closed, and the battery is capable of being charged using the AC power source.

20. The electric system of claim 18 further comprises a third relay electrically connected to the first relay, the motor, and the motor driving inverter.

21. The electric system of claim 20, wherein the motor comprises a plurality of phases, the motor driving inverter comprises a plurality of phase legs, and one of the phases of the motor is connected to a respective one of the phase legs of the motor driving inverter through the third relay.

22. The electric system of claim 21, wherein in a driving mode, the first relay is opened and the second relay and the third relay are closed, and the battery is capable of being discharged to power the motor; and/or in a charging mode, the first relay and the second relay are closed and the third relay is opened, and the battery is capable of being charged using the AC power source.

* * * * *